US012775091B2

(12) United States Patent
Keränen

(10) Patent No.: US 12,775,091 B2
(45) Date of Patent: Oct. 27, 2026

(54) DEVICE FOR DETERMINING A DISTANCE, SURFACE THICKNESS AND OPTICAL PROPERTIES OF AN OBJECT AND RELATED METHOD

(71) Applicant: LMI TECHNOLOGIES INC., Burnaby (CA)

(72) Inventor: Heimo Keränen, Oulu (FI)

(73) Assignee: LMI TECHNOLOGIES INC., Bumbay (CA)

( * ) Notice: Subject to any disclaimer, the term of this patent is extended or adjusted under 35 U.S.C. 154(b) by 803 days.

(21) Appl. No.: 18/029,076

(22) PCT Filed: Sep. 29, 2021

(86) PCT No.: PCT/FI2021/050644
§ 371 (c)(1),
(2) Date: Mar. 28, 2023

(87) PCT Pub. No.: WO2022/069801
PCT Pub. Date: Apr. 7, 2022

(65) Prior Publication Data
US 2023/0408695 A1 Dec. 21, 2023

(30) Foreign Application Priority Data
Sep. 29, 2020 (FI) ..................................... 20205942

(51) Int. Cl.
*G01S 17/48* (2006.01)
*G01M 11/08* (2006.01)
*G01S 7/481* (2006.01)

(52) U.S. Cl.
CPC ........... *G01S 17/48* (2013.01); *G01M 11/081* (2013.01); *G01S 7/4811* (2013.01)

(58) Field of Classification Search
CPC ...... G01S 17/48; G01S 7/4811; G01M 11/081
See application file for complete search history.

(56) References Cited

U.S. PATENT DOCUMENTS

2012/0206710 A1* 8/2012 Niemela ............ G01B 11/0608 356/369
2015/0219454 A1* 8/2015 Keranen ............ G01N 21/8422 356/4.07
2020/0174127 A1 6/2020 Dietz

FOREIGN PATENT DOCUMENTS

JP 2008-065876 A 3/2008
WO 2016000764 A1 1/2016

OTHER PUBLICATIONS

International Search Report and Written Opinion for International Application No. PCT/FI2021/050644, mailed Dec. 10, 2021, 14 pages.

* cited by examiner

*Primary Examiner* — Jamil Ahmed
(74) *Attorney, Agent, or Firm* — Stoel Rives LLP

(57) ABSTRACT

Described herein is a device for determining the position and/or optical properties of an object (2). The device comprises at least one output element (4.1) for providing light, illuminating optics (11) for directing light from the output element to the object, a light sensor (8) and imaging optics (13) for collecting light from the object to the light sensor. The device is configured to determine the position and/or optical properties of the object (2) from the local maximum of the intensity distribution of the light detected by the light sensor (8), where the local maximum is a result of the light collected from the intersection of the object point (2.1) and one of the coincident focus points or focus areas formed by the illuminating (11) and imaging optics (11). The device can be used for determining intensity value for the light reflected from the object point (2.1) with at least with two different wavelengths. Also described herein is a method for determining the position and/or optical properties of an object (2).

24 Claims, 11 Drawing Sheets

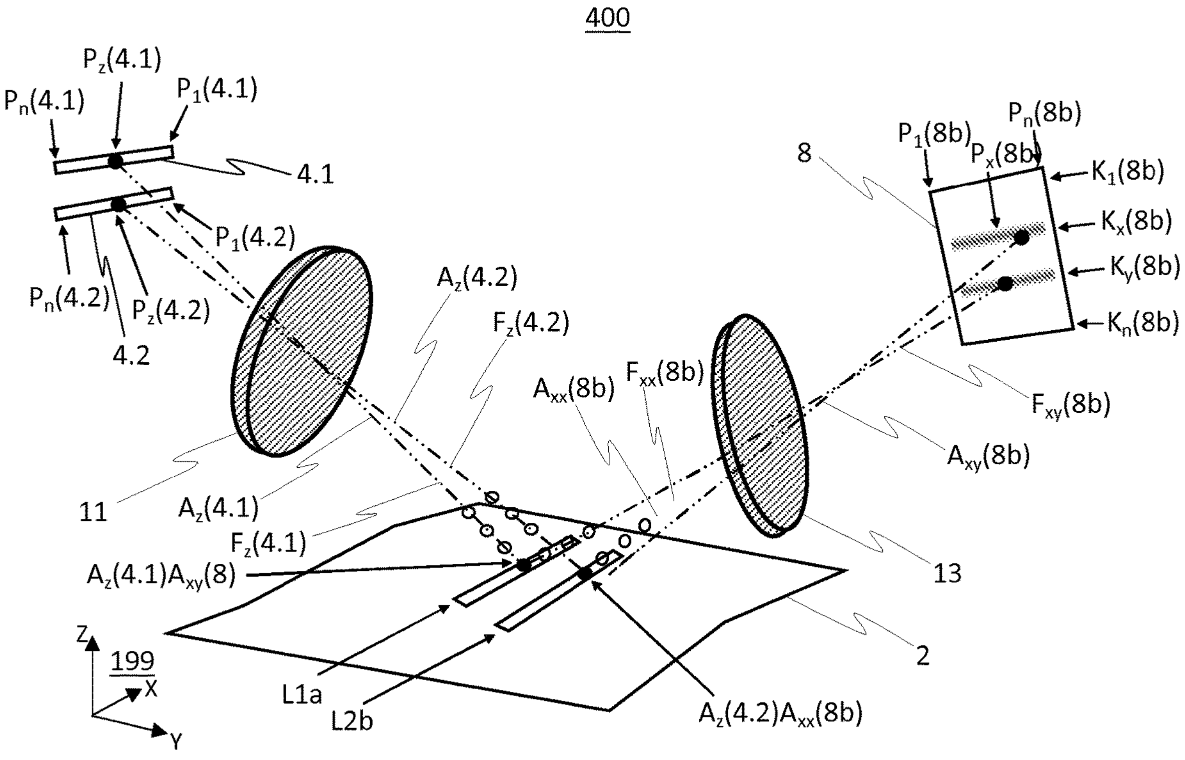
FIG. 3
FIG. 4a
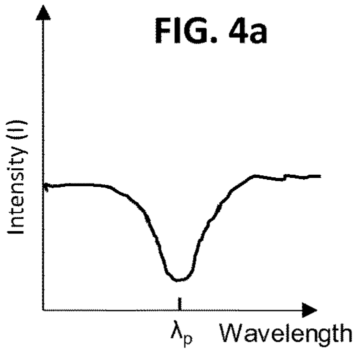
FIG. 4b
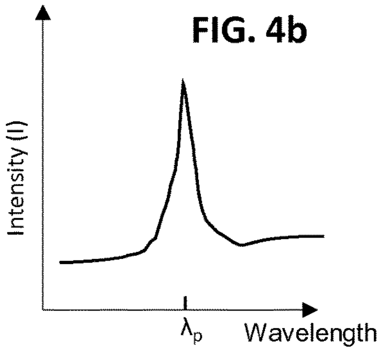

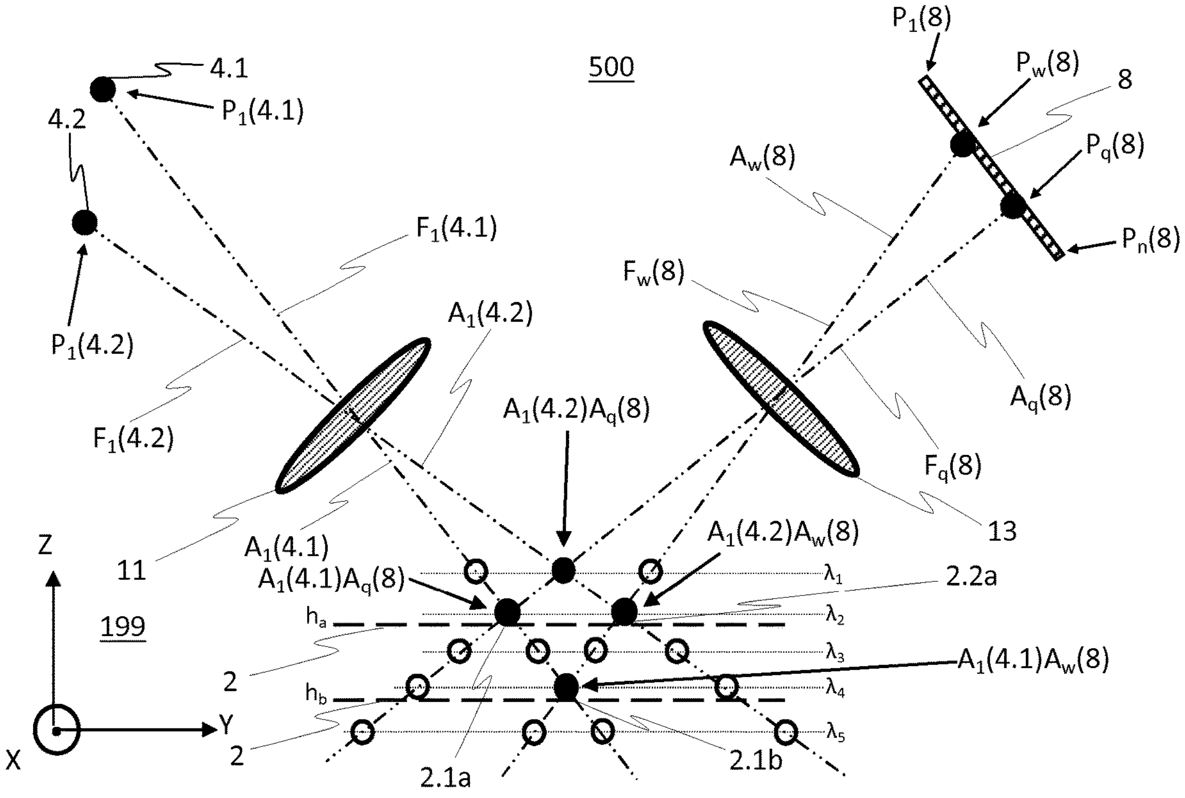
FIG. 5a
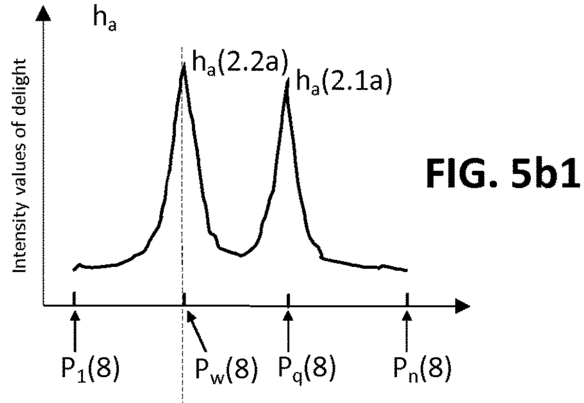
FIG. 5b1
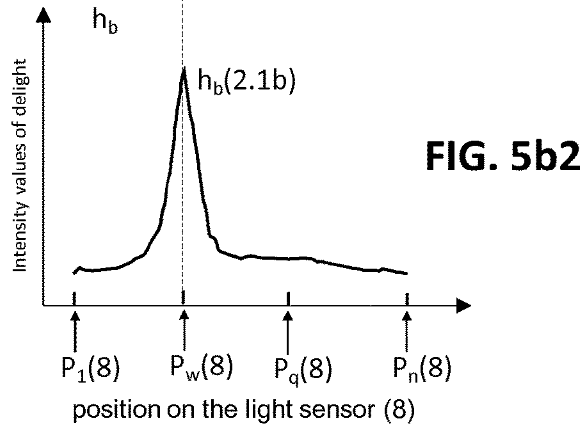
FIG. 5b2

DEVICE FOR DETERMINING A DISTANCE, SURFACE THICKNESS AND OPTICAL PROPERTIES OF AN OBJECT AND RELATED METHOD

RELATED APPLICATIONS

This application is a national stage under 35 U.S.C. § 371 of International Application No. PCT/FI2021/050644, filed Sep. 29, 2021, which claims priority of Finland Patent Application No. 20205942, filed Sep. 29, 2020, each of which are hereby incorporated by reference in their entirety.

TECHNICAL FIELD

Generally, the disclosure relates to optical measurements and imaging. More particularly, however not exclusively, the disclosure relates to the determination of a position and optical properties of an object.

BACKGROUND

Non-contact optoelectronic measuring devices provide a non-destructive and relative high-speed approach for providing surface profiles and surface characterisation. There exists a variety of different techniques to perceive a depth information for measuring distances and orientations of objects and surfaces such as confocal, structured light or laser triangulation, white light interferometry, fringe projection or depth of focus imaging techniques.

Triangulation devices are widely used to add a depth information into different kinds of industrial machine vision systems partly due to their relative simplicity and ease of use. In triangulation-based devices, typically a laser beam or LED, is projected onto the object under measurement and light reflected from the object point is detected by a light sensor at an imaging angle depending on the distance between the light source and the object point. The imaging angle, the baseline between the light source and light sensor and the angle of the light projected from the light source define a triangulation geometry from which the depth information and surface profile can be extracted. It is common to also extract the intensity of the detected light to provide reflectance of the surface revealing information about important material optical properties.

One known problem in the present triangulation devices is that the measurement speed is limited to the frame rate of the light sensor.

One known problem in the present laser-triangulation devices is an inevitable speckle noise that is seen as interference patterns on the light sensor due to coherent illuminating photons, impairing the extraction of the surface position and surface optical properties.

Yet another known problem in the present laser-triangulation devices arises from the restriction to use only small numerical aperture optics which severely limits the capability to produce surface profiles for glossy, sloped surfaces.

SUMMARY

The aim of the invention is to at least alleviate one or more problems associated with the existing solutions in the context of determination of a surface position and surface optical properties of an object under measurement. Especially an aim of the invention is to provide a measurement device for determining surface position and surface optical properties that allows to increase measurement speed. Additionally, an aim of the invention is to provide such a measurement device that is also suitable for determining surface position and surface optical properties of glossy, sloped surfaces. Additionally, an aim of the invention is to simplify the arrangement of the measurement device. Further aim of the invention is to provide a device and a method capable of determining simultaneously surface position and at least one of property of the surface selected from the group consisting of reflectance, reflectivity, transmittance and transmission with one or more different wavelengths of light.

The following presents a simplified summary to provide a basic understanding of some concepts of the invention in a simplified form as a prelude to a more detailed description of exemplifying and non-limiting embodiments of the invention.

The object of the invention can be achieved by the features of independent claims.

In accordance with one aspect of the present invention, there is provided a new device for determining a position and/or optical properties of an object. A device according to the invention comprises:

a point-like or line-like output element for providing light;

illuminating optics for directing light from the output element to the object;

a light sensor for detecting intensity values of light; and imaging optics for collecting light from the object to the light sensor.

The illuminating optics is configured to focus light from a location point of the output element on a plurality of illuminating focus points or focus areas positioned at different distances from the illuminating optics along an illuminating coordinate axis associated with a principal ray of the illuminating optics for the location point of the output element, wherein the principal ray is the mutual for the plurality of illuminating focus points or focus areas focused from the location point of the output element, and wherein each of the illuminating focus points or focus areas along the same illuminating coordinate axis differs from each other at least in the dominant wavelength or shape and/or is formed with a different optical aperture of the illuminating optics.

The imaging optics is configured to form from each of the location points of the light sensor a plurality of imaging focus points or focus areas positioned at different distances from the imaging optics along an imaging coordinate axis associated with a corresponding principal ray of the imaging optics for the corresponding location point of the light sensor, wherein the corresponding principal ray is the mutual for the plurality of imaging focus points formed from the corresponding location point of the light sensor, and wherein each of the imaging focus points or focus areas along the same imaging coordinate axis differs from each other at least in the dominant wavelength or shape and/or is focused with a different optical aperture of the imaging optics.

The illuminating optics and the imaging optics are configured to form a plurality of coincident focus points or focus areas so that each of the various focus points or focus areas from the plurality of illuminating focus points or focus areas along the same illuminating coordinate axis coincides at a coincident focus point or focus area with an imaging focus point or focus area positioned along a different imaging coordinate axis, where the orientation of the illuminating coordinate axis is different from the orientations of the imaging coordinate axes. Furthermore, the illuminating optics and the imaging optics are configured to form the plurality of coincident focus points or focus areas so that each of the coincident focus points or focus areas consists of an illuminating and imaging focus point or focus area associated with the common dominant wavelength or shape and/or is formed with the correlated optical apertures of the illuminating optics and the imaging optics.

The device is configured to determine the position and/or optical properties of an object point of the object from the local maximum of the intensity distribution of the light detected by the light sensor so that:

- the position of the object point is determined from the location of said local maximum; and/or
- the optical properties of the object point are determined from the intensity or the wavelength of said local maximum, where said local maximum is a result of the light collected from the intersection of the object point and one of the coincident focus points or focus areas.

In accordance with the present invention, there is provided also a new method for determining a position and/or optical properties of an object. A method according to the invention comprises:

- providing an optical illuminating and optical detecting of the object from different directions so that:
  - light is focused from a location point of the output element on a plurality of illuminating focus points or focus areas positioned at different distances from the illuminating optics along an illuminating coordinate axis associated with a principal ray of the of the illuminating optics for the location point of the output element, wherein the principal ray is the mutual for the plurality of illuminating focus points or focus areas focused from the location point of the output element, and wherein each of the illuminating focus points or focus areas along the same illuminating coordinate axis differs from each other at least in the dominant wavelength or shape and/or is formed with a different optical aperture of the illuminating optics, and
  - a plurality of imaging focus points or focus areas positioned at different distances from the imaging optics along an imaging coordinate axis associated with a corresponding principal ray of the imaging optics for the corresponding location point of the light sensor are formed from each of the location points of the light sensor, wherein the corresponding principal ray is the mutual for the plurality of imaging focus points or focus areas formed from the corresponding location point of the light sensor, and wherein each of the imaging focus points or focus areas along the same imaging coordinate axis differs from each other at least in the dominant wavelength or shape and/or is focused with a different optical aperture of the imaging optics;
- forming a plurality of coincident focus points so that each of the various focus points from the plurality of illuminating focus points or focus areas along the illuminating coordinate axis coincides at a coincident focus point or focus area with a imaging focus point or focus area positioned along a different imaging coordinate axis, where the orientation of the illuminating coordinate axis is different from the orientations of the imaging coordinate axes and that each of the coincident focus points or focus areas consists of an illuminating and imaging focus point or focus area associated with the common dominant wavelength or shape and/or is formed with the correlated optical apertures of the illuminating optics and the imaging optics;
- detecting by the light sensor the intensity values of the light collected from the object by the imaging optics; and
- determining the position and/or optical properties of an object point of the object so that the position of the object point is determined from the location of the local maximum of the intensity distribution of the detected light, and/or the optical properties object point are determined from the intensity or the wavelength of the local maximum of the intensity distribution of the detected light, where said local maximum is a result of the light collected from the intersection of the object point and one of the coincident focus points or focus areas.

In accordance with the present invention, there is provided also the use of the device for determining a thickness between a first surface and a second surface of the object, wherein the object is at least partially transparent or translucent for the light being directed to the object.

The present invention offers advantages over the prior art, for example, that the invention:

- may allow to utilize large illuminating and imaging numerical apertures enabling measuring of glossy, sloped surfaces;
- may allow to use high numerical aperture optics in the illuminating and imaging and still maintain a large depth of field and consequently large depth (z-direction) measuring range;
- may allow to achieve focused measuring of an object with full measuring space;
- may allow to measure simultaneously several, for example tens, surface profiles with a single image frame and hence increasing the measurement speed;
- may allow to provide a noncoherent light illuminating and hence enabling to collect light onto the light sensor without speckle noise;
- may allow to determine the position of an object point accurately regardless of the diffuse reflection or glossiness of the object;
- may allow to utilize same kinds of optics for illuminating and imaging.

Various exemplifying and non-limiting embodiments are described in accompanied dependent claims. The features recited in depending claims are mutually freely combinable unless otherwise explicitly stated.

In this document, the word “plurality” refers to a quantity of two or more. Furthermore, it is to be understood that the use of “a” or “an”, i.e. a singular form, throughout this document does not exclude a plurality.

In this document, the word “axis” means an imaginary line and the word “axes” is the plural form of the word “axis”.

The verbs “to comprise” and “to include” are used in this document as open limitations that neither exclude nor require the existence of unrecited features.

The novel features which are considered as characteristic of the invention are set forth in particular in the depended claims. The invention itself, however, both as to its construction and its method of operation, together with additional objects and advantages thereof, will be best understood from the following description of specific example embodiments when read in connection with the accompanying drawings.

The considerations concerning the various embodiments of the device may be flexibly applied to the embodiments of the method mutatis mutandis, and vice versa, as being appreciated by a skilled person.

The embodiments in the following detailed description are given as examples only and someone skilled in the art can carry out the basic idea of the invention also in some other way than what is described in the description. Most embodiments can be actualized in a variety of combinations with other embodiments. Though the description may refer to a certain embodiment or embodiments in several places, this does not imply that the reference is directed towards only one described embodiment or that the described characteristic is usable only in one described embodiment. The individual characteristics of a plurality of embodiments may be combined and new embodiments of the invention may thus be provided.

BRIEF DESCRIPTION OF THE DRAWINGS

Next the present invention will be described in greater detail with reference to the accompanying drawings, in which:

FIG. 3 illustrates schematically an embodiment of a device for determining a position and/or optical properties of an object;

FIG. 4*a*, 4*b* illustrate spectral contents;

FIG. 5*a* illustrates schematically an embodiment of a device for determining a position and/or optical properties of an object;

FIG. 5*b*1, 5*b*2 illustrate exemplary intensity distribution diagrams in accordance with FIG. 5*a;*

DETAILED DESCRIPTION

Figure 1A:
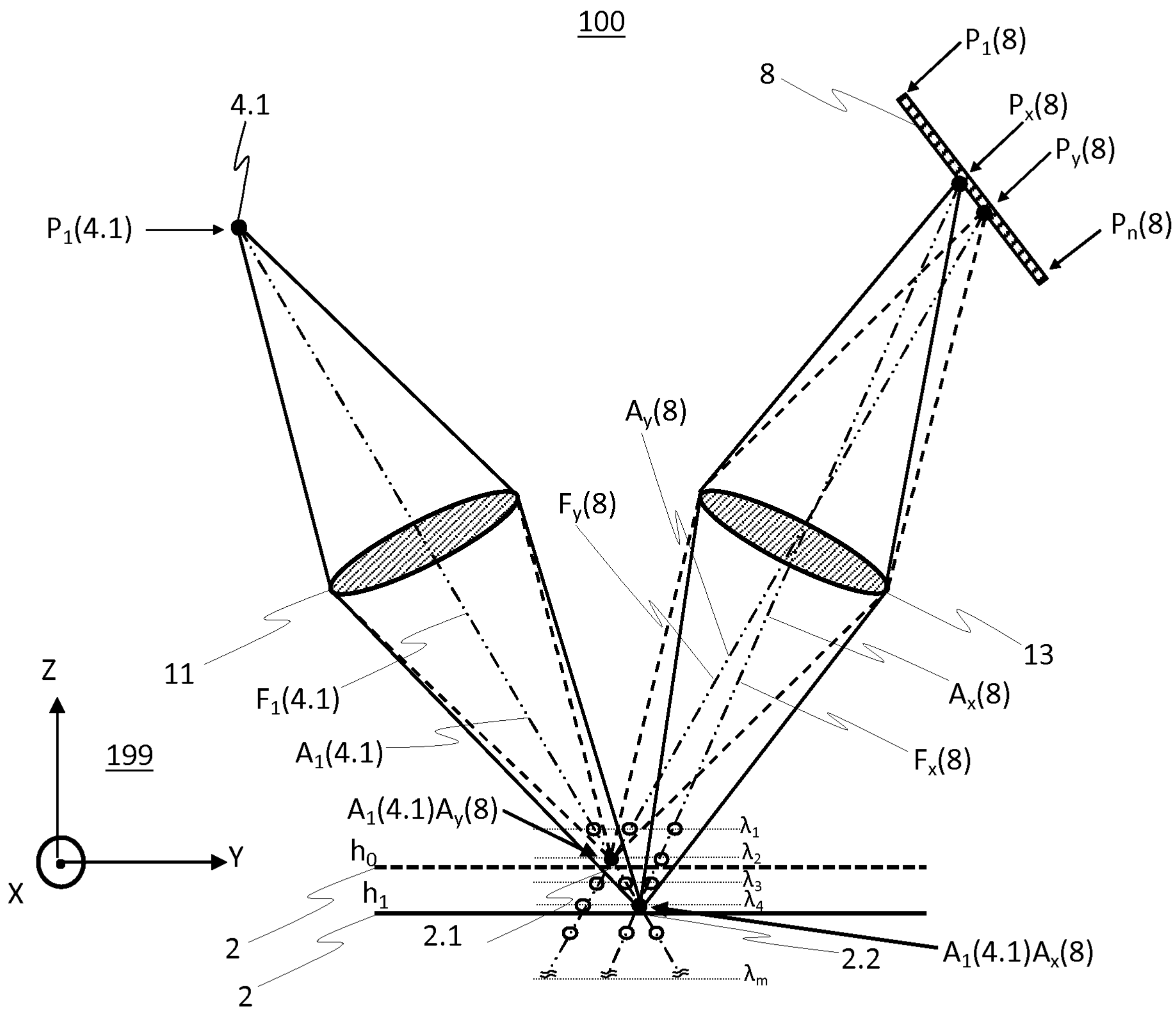
FIG. 1*a* illustrates schematically an embodiment of a device for determining a position and/or optical properties of an object.

In the following, some embodiments of the invention are disclosed. In the described embodiments, illuminating and imaging of the surface of the object are realized biaxially from different directions. Thus, a virtual measuring space can be created by coinciding the image of the projected illuminating source or illuminating sources of the illuminating and the image of the light sensor of the imaging in such a way that numerous coincident focus points (measuring lines and/or groups of measuring points of coinciding focus points or focus areas) are common for both of said optics. As the object to be measured intersects the virtual measuring space, one or more coincident focus points or focus areas of the virtual measuring space intersect said object in certain object points. A strong reflection generated from this intersection of the object point and a coincident focus point or focus area is indicated by a light sensor and converted to a surface position of the object under measurement.

In this document, reflection refers to specular reflection and diffuse reflection in which reflection may take place from a smooth or rough surface. In addition, reflection also refers herein to scattering, refracting and reflecting radiation from inside the object to be measured.

In order to intersect the object point, which can be for example a point from the surface of the object to be measured, advantageously the geometric shape of the output element of illuminating which provides light, or at least part of it, is projected via the illuminating optics, and this image is monitored with the imaging wherein light reflected from the object is collected via the imaging optics onto the light sensor. In the intensity distribution of the light detected by the light sensor, local intensity maxima are resulted in those points that correspond to intersections of the object point and the images of the location point of projected light source geometry and the light sensor geometry. Position of the object point is determined from the place of the local intensity maximum of the light distribution defined by the light sensor and the optical properties object point are determined from the intensity or the wavelength of the local intensity maximum.

In this document the location or place of a local maximum of the intensity distribution is the location on the light sensor 8 where the intensity value of the detected light reaches a local maximum value.

If the object to be measured (i.e. target) consists of several partly light-permeable and reflecting surfaces, such as, for example, a plastic film or a glass plate, the method creates from these surfaces an individual local intensity maximum, respectively, and the thickness of the film or plate can be defined on basis of the difference between the positions of these intensity maxima when the refractive indexes of the materials involved in the measurement and the measurement geometry are known. The measurement geometry comprises illuminating angles and imaging angles and the geometry of the object 2 under measurement respect to said angles.

In some cases, it is also possible to determine positions of object points on sub-surfaces of the object, i.e. internal structures of the object depending on optical properties (like transparency and translucency) of the object for the light being directed to the object.

In respective figures, the same or corresponding parts are denoted by the same reference numerals, and in most cases duplicate textual description will be omitted as well.

FIG. 1*a* illustrates a device according to an embodiment 100. The device comprises one point-like output element 4.1 (i.e. point formed output element) for providing light, illuminating optics 11 for directing light from the output element 4.1 to the object 2 being measured, a light sensor 8 for detecting intensity values of light and imaging optics 13 for collecting light from the object 2 to the light sensor 8.

Both the optical illuminating means and optical imaging means of the device are configured to form the focus points or focus areas of them both to the virtual measuring space such that the illuminating optics 11 focuses different points from the illuminating, comprising one or more output elements 4.1, and imaging optics 13 focuses different points from the imaging area, comprising the light sensor 8, in a known way on the virtual measuring space to different positions. Each focus points or focus areas formed by the illuminating optics 11 from a certain location point of the illuminating (i.e. output element) differs from each other at least in the dominant wavelength or shape and/or is formed with a different optical aperture of the illuminating optics 11. Correspondingly, each focus points or focus areas formed by the imaging optics 13 from a certain location point of the imaging area (i.e. light sensor) differs from each other at least in the dominant wavelength or shape and/or is formed with a different optical aperture of the imaging optics 13. Coincident focus points or focus areas are formed such that at each coincident focus point or coincident focus area an illuminating focus point or an illuminating focus area (i.e. focus point or focus area formed by the illuminating optics 11) coincides (overlaps) with an imaging focus point or an imaging focus area (i.e. focus point or focus area formed by the imaging optics 13) with the same common dominant wavelength or shape. Additionally, or alternatively, said focus points or focus areas are formed with the correlated optical apertures of the illuminating optics 11 and the imaging optics 13. In other words, each of the coincident focus points or focus areas consists of an illuminating and imaging focus point or focus area associated with the common dominant wavelength or shape and/or is formed with the correlated optical apertures of the illuminating optics 11 and the imaging optics 13. Thereby, there is possible to form a plurality of coincident focus points or focus areas (i.e. common focus points or common focus areas) which each coincident focus point or focus area is associated with the common dominant wavelength of formed focus points or focus areas and/or is formed with the correlated optical apertures of the illuminating optics 11 and the imaging optics 13. When an object point of the surface of the object 2 to be measured coincides one of such formed coincident focus point or coincident focus area of the virtual measuring space, the reflection generated from it is very strong in comparison with the light reflected from other object points of the surface of the object 2. With the imaging optics 13, the light reflected from the surface of the object 2 is directed to the light sensor 8, where the position of the local intensity maximum of the propagated light is detected and the position and intensity data of detected light is formed into an electrical signal. The light sensor 8 can be, for example, a CCD, CMOS matrix, a position sensitive detector (PSD) or the like. The device determines by the processing means (not shown in FIG. 1*a*) from the electrical signal the maximum reflection representing the surface profile of the object 2, wherein by said means the measured positions of objects points of the object 2 is determined. Alternatively, or additionally, optical properties of the object point can be determined from the intensity value of corresponding signal of maximum reflection corresponding the intensity value of corresponding local intensity maximum or from the wavelength of said local intensity maximum.

In various embodiments, the output element 4.1 may generally comprise or consist of a LED or laser based light source for illuminating and providing light.

In various embodiments, an individual output element may advantageously comprise a separate light source and a separate slit or pinhole through which light (i.e. illumination) from the separate light source is provided.

The provided light (i.e. optical radiation) from the output element can be electromagnetic radiation with the wavelength band of which is located from ultraviolet radiation (wavelength ca. 50 nm) to infrared radiation (wavelength ca. 1 mm).

The provided light can be either white light (i.e. comprising all visible wavelengths) or can comprise either one wavelength or many different wavelengths.

In various embodiments the provided light can be either coherent or noncoherent light.

The illuminating optics 11 and imaging optics 13 may comprise lens or lenses, mirrors or other optical components. Furthermore, the illuminating optics 11 and imaging optics 13 may be identical or nonidentical.

Figure 2A:
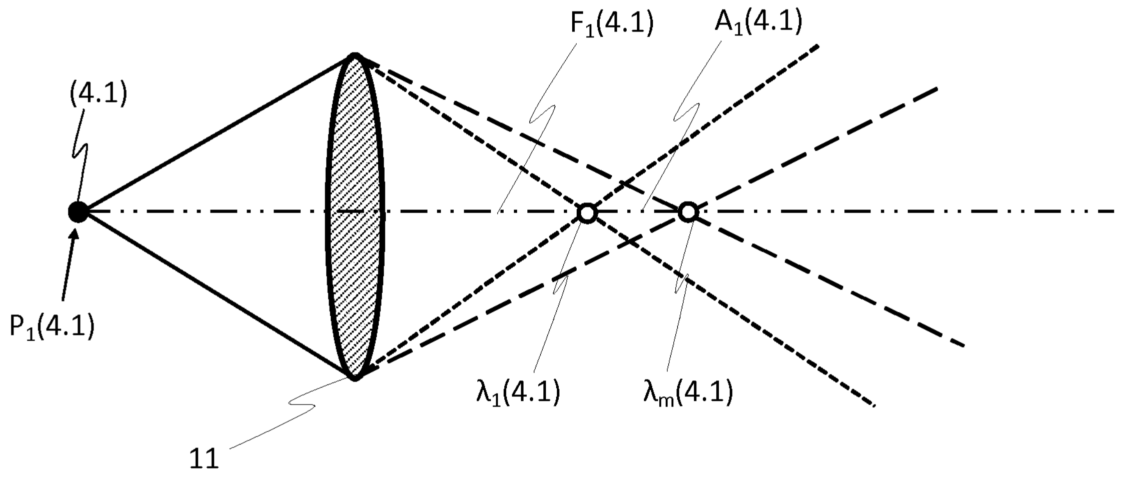
FIGS. 2*a*, 2*b*, 2*c* illustrate schematically different optical aberrations utilized in the embodiments.

In the device of the embodiment 100 longitudinal chromatic aberration is utilized in the illuminating optics 11 and the imaging optics 13. Due to the longitudinal chromatic aberration, different illuminating focus points from the location point $P_1$(4.1) of the output element 4.1 in wavelengths $\lambda_1$(4.1), $\lambda_2$(4.1), $\lambda_3$(4.1), $\lambda_4$(4.1), $\lambda_m$(4.1) and different imaging focus points from the different location points between the end points $P_1$(8) and $P_n$(8) of the light sensor 8 in wavelengths $\lambda_1$(8), $\lambda_2$(8), $\lambda_3$(8), $\lambda_4$(8), $\lambda_m$(8) are formed at different distances form said optics in direction of the corresponding principal rays, see FIG. 1*a*. This is illustrated also in FIG. 2*a* for the illuminating optics 11 in greater scale. Illuminating focus points which are formed from the location point $P_1$(4.1) of the output element 4.1 are along the same illuminating coordinate axis $A_1$(4.1). Principal ray $F_1$(4.1) is the mutual for the illuminating focus points which are formed from the location point $P_1$(4.1) of the output element 4.1 and locate at different distances with different wavelengths from the illuminating optics 11. Accordingly, the imaging focus points formed from the same location point $P_1$(8)→$P_n$(8) of the light sensor 8 have similarly the same principal ray $F_1$(8)→$F_n$(8) of the imaging optics 13 for the corresponding location point $P_1$(8)→$P_n$(8) and are along the same imaging coordinate axis $A_1$(8)→$A_n$(8). In FIG. 1*a*, the principal ray $F_x$(8) and the associated imaging axis $A_x$(8) for the imaging focus points formed from the location point $P_x$(8) and the principal ray $F_y$(8) and the associated imaging axis $A_y$(8) for the imaging focus points formed from the location point $P_y$(8) of the light sensor 8 are illustrated.

In this document a set of different objects is denoted as "the first object"→"the last object", such that by $P_1$(8)→$P_n$(8) is meant a set of different location points between the extreme location points $P_1$(8) and $P_n$(8) of the light sensor, wherein n can be any integer that is greater than 1.

The point-like output element 4.1 of the device in the embodiment 100 may advantageously be a LED based light source radiating white light.

In the embodiment 100, by adjusting a distance of the output element 4.1 from the illuminating optics 11, a displacement of the output element 4.1 from the optical axis of the illuminating optics 11, a distance of the light sensor 8 from the imaging optics 13 and an inclination of the light sensor 8 from the optical axis of the imaging optics 13, said optics are configured to form coincident focus points from the illuminating focus points of the location point $P_1$(4.1) of the output element 4.1 and the imaging focus points of the different location points $P_1$(8)→$P_n$(8) of the light sensor 8. At each coincident focus point one illuminating focus point of the location point $P_1$(4.1) coincides (i.e. meets) with one imaging focus point of one location point $P_1$(8)→$P_n$(8) of the light sensor 8 with the same wavelength. In other words, the coinciding focus point is associated with the common dominant wavelength of the coinciding focus points. Furthermore, in order to measure different positions of the intersecting object 2, the coincident focus points are formed so that each of the illuminating focus points of the location point $P_1$(4.1) of the output element 4.1, which forms coincident focus point, coincides with such an imaging focus point of the location points $P_1$(8)→$P_n$(8) of the light sensor 8 that is along different imaging coordinate axis $A_1$(8)→$A_n$(8). Different imaging coordinate axes $A_1$(8)→$A_n$(8) and imaging focus points along these axes correspond different location points $P_1$(8)→$P_n$(8) of the light sensor 8.

Therefore, there are advantageously numerous (various) coincident focus points formed from the various illuminating focus points of the location point $P_1$(4.1) of the output element 4.1 which each of the various illuminating focus points are coinciding with an imaging focus point of the location points $P_1$(8)→$P_n$(8) of the light sensor 8 positioned along a different imaging coordinate axis $A_1$(8)→$A_n$(8).

In the embodiment 100, by lens or lenses of the illuminating optics 11 and imaging optics 13 is produced longitudinal (axial), chromatic aberration. Thereby, in the embodiment 100, the components $\lambda_m$(4.1), $\lambda_m$(8) of the red end of the light are in focus in the virtual measuring space under the surface of the object 2, and, correspondingly, the components $\lambda_1$(4.1), $\lambda_1$(8) of the blue end of the light are in focus above the object 2. In the embodiment 100, both the blue ends $\lambda_1$(4.1), $\lambda_1$(8) of the illuminating and imaging are in focus in the upper edge of the virtual measuring space. Accordingly, the red ends $\lambda_m$(4.1), $\lambda_m$(8) of the spectra are in focus in the bottom edge of the measuring space (under the object 2 at height $h_1$ in FIG. 1*a*). The height of the surface of the object 2 has an effect on which component of the spectrum of the light directed to the object is reflected from it. The colour of the component of the spectrum is not important in this embodiment, since the light signal reflected from the object 2 is detected advantageously by a black and white line or matrix light sensor 8 or camera. However, in certain case this wavelength information of the reflected light is utilized as we see later in this document.

In the example of FIG. 1*a* two different cases of the surface heights $h_0$ and $h_1$ of the object 2 are illustrated. These surface layers scatter light. An intersection of the object 2 and coincident focus point is exemplified from the both illustrated heights. When the surface is at the surface height $h_0$ the object point 2.1 intersects with the coincident point $A_1(S)A_y(R)$ of wavelength $\lambda_2$. This intersection is indicated by the location point of $P_y(R)$ of the light sensor 8. Respectively, when the surface is at the surface height $h_1$ the object point 2.2 intersects with the coincident point $A_1(S)A_x(R)$ of wavelength $\lambda_4$. This intersection is indicated by the location point of $P_x(R)$ of the light sensor 8.

Figure 1B:
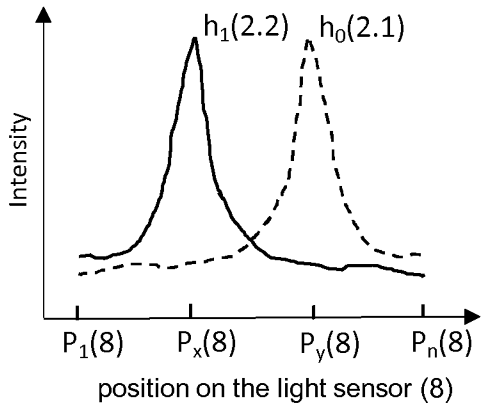
FIG. 1*b* illustrates an exemplary intensity distribution diagram in accordance with FIG. 1*a;*

FIG. 1*b* shows an example of a signal according to the example of FIG. 1*a*, received from the light sensor 8 of the device. FIG. 1*b* shows the intensity of the light coming to the light sensor 8 as a function of a position of the location points of the light sensor 8. Local maximum signal $h_0$(2.1) is caused by a reflection from the object point 2.1 (i.e. an intersection of the object point 2.1 and the coincident focus point $A_1$(4.1)$A_y$(8)) at height $h_0$ of the object 2. Another local maximum signal $h_1$(2.2) is a result of a reflection coming from the object point 2.2 (i.e. an intersection of the object point 2.2 and the coincident focus point $A_1$(4.1)$A_x$(8)) at height $h_1$ of the object 2. Advantageously the position of the received local maximum signal is calibrated to correspond to a position in accordance with the coordinate system 199.

In the device the position of the received local maximum on the light sensor 8 and the location point of the output element from which the light reflected from the intersection of the object point and the coincident focus point, is calibrated, based on triangulation, to correspond a certain position of the object 2.

In the embodiment 100, both the illuminating and imaging are shown in a symmetrical angle in regard of the surface of the object 2. The invention is however not restricted to this kind of a symmetrical measuring situation, but the angles of the illuminating and imaging in regard of the object surface can be of different size without having an effect of the measuring event. Although the angle between illuminating and imaging changes, nevertheless, coincident focus points defining the measuring space can be formed such that at each coincident focus points an individual illuminating focus point coincides with an imaging focus point associated with a common dominant wavelength.

In the embodiment 100, the output element 4.1 is in the optical axis of the illuminating optics 11. The position of illuminating and the output element 4.1 is however not restricted to this position, but the output element 4.1 can be located also otherwise as we see in the further embodiments.

In the embodiment 100 the spectrum of the light provided by the output element 4.1 does not need to be continuous, but can comprise, for example sequences of different wavelengths or sequences of differently way discontinuous light.

Switching over to second embodiment 200, various features of embodiment 200 are generally considered similar to the one of embodiment 100 and are not repeated here to avoid unnecessary redundancy.

However, the embodiment 200 differs from the embodiment 100 in that spherical aberration is provided in the lens or lenses of the illuminating optics 11 and imaging optics 13. In that case said optics refract the light to different illuminating focus points $\theta_1$(4.1)→$\theta_m$(4.1) and imaging focus points $\theta_1$(8)→$\theta_m$(8) on the grounds that where the light propagates through the illuminating optics 11 or imaging optics 13. Light beams propagating through the optics at the centre have their focus point $\theta_{1\rightarrow m}$(4.1), $\theta_{1\rightarrow m}$(8) further away than the light beams propagating through the outer edges of the lens.

Figure 2B:
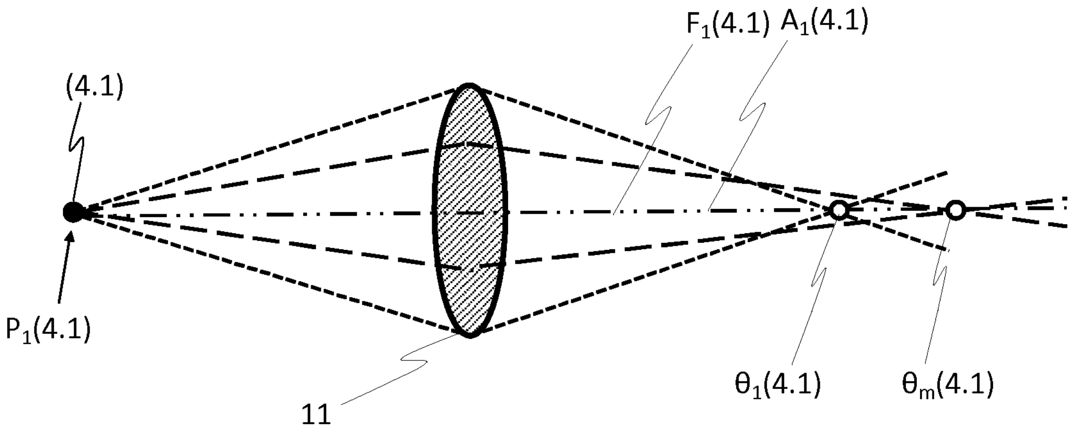

This is illustrated in FIG. 2*b* for the illuminating optics 11 with two different numerical apertures $\theta_1$(4.1) and $\theta_m$(4.1) from the location point $P_1$(4.1) of the output element 4.1. The exemplary lens of the illuminating optics 11 is configured to form from the location point $P_1$(4.1) a plurality of different illuminating focus points positioned at different distances from the illuminating optics 11 along an illuminating coordinate axis $A_1$(4.1) with different numerical apertures of the lens or lenses of the illuminating optics 11. Accordingly, the imaging optics 13 comprises the same property. In case of imaging, when spherical aberration is provided, the imaging optics 13 is configured to form from each of the location points $P_1$(8)→$P_n$(8) of the light sensor (8) a plurality of different imaging focus points positioned at different distances from the imaging optics 13 along an imaging coordinate axis $A_1$(8)→$A_n$(8) with different numerical apertures of the lens or lenses of the imaging optics 13. In this embodiment, the measuring can be realized either with one wavelength, various wavelengths or white light.

In the embodiment 200, the measuring is based on the spherical aberration of the lens or lenses, or generally, the spherical aberration of the optical components, of the illuminating optics 11 and imaging optics 13. The coinciding focus points can be arranged in the same way as illustrated in the example of FIG. 1*a* for the embodiment 100. Thereby, the components $\theta_m$(4.1), $\theta_m$(8) which are formed with the smallest angular apertures of the lens or lenses of said optics are in focus in the virtual measuring space under the surface of the object 2, and, correspondingly, the components $\theta_1$(4.1), $\theta_1$ (8) which are formed with the largest angular apertures of the lens or lenses of said optics are in focus above the object 2. Now, when spherical aberration is utilized, at each coincident focus point, one illuminating focus point of the location point $P_1$(4.1) of the output element 4.1 coincides (i.e. meets) with one imaging focus point of one location point $P_1$(8)→$P_n$(8) of the light sensor 8 so that these coinciding focus points $\theta_{1\rightarrow m}$(4.1) and $\theta_{1\rightarrow m}$(8) are formed with the correlated (equal) optical apertures of the illuminating optics (11) and the imaging optics (13) producing a local maximum on the light sensor 8 when this coinciding focus point is intersected with the object 2.

A third embodiment 300 differs from the embodiment 200 in that astigmatism is provided in the lens or lenses of the illuminating optics 11 and imaging optics 13. In that case said optics refract the light to different focus areas $\varphi_1$(4.1) →$\varphi_m$(4.1) and $\varphi_1$(8)→$\varphi_m$(8) so that a focus from a certain location point is appearing as in between a line or ellipse shape instead of a point shape at different distances from said optics. Due to astigmatism light beams lying in the tangential and sagittal planes are refracted in said optics differently and both sets of beams intersect the corresponding principal ray for corresponding location point at different focus areas on the grounds where the light propagates through the illuminating optics 11 or imaging optics 13. These light beams of tangential and sagittal planes fail to produce a focused image point, but rather produce a series of elongated focus areas ranging from linear to elliptical, depending upon the distance from said optics.

Figure 2C:
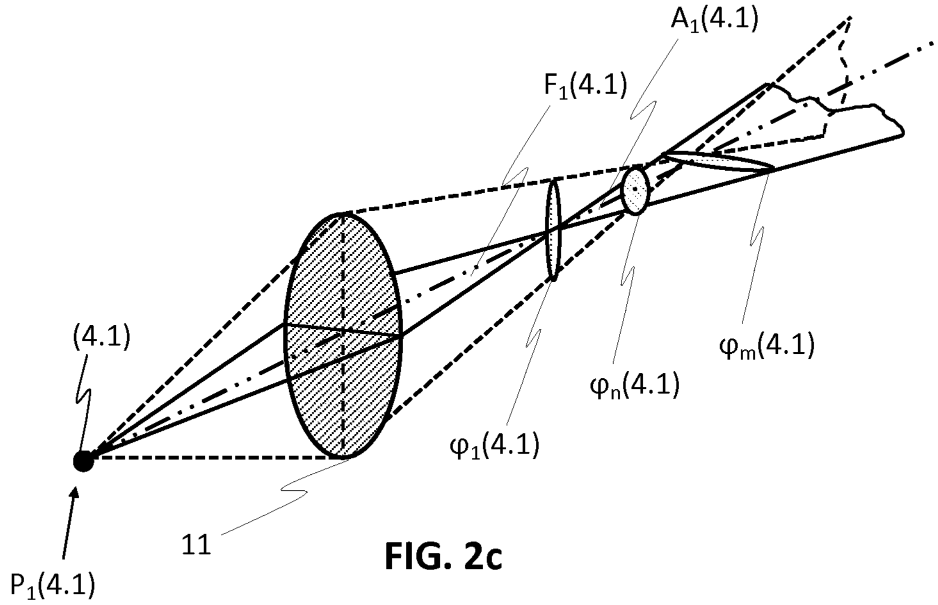

This is shown in FIG. 2*c* for the illuminating optics 11 where three different illuminating focus areas $\varphi_1$(4.1), $\varphi_n$(4.1) and $\varphi_m$(4.1) with different shapes formed from the location point $P_1$(4.1) of the output element 4.1 by different optical apertures of the illuminating optics 11 are illustrated. Accordingly, the imaging optics 13 comprises the same property.

In the embodiment 300, the measuring is based on the astigmatism of the lens or lenses of the illuminating optics 11 and imaging optics 13. The coinciding focus points can be arranged in the same way as illustrated in the example of FIG. 1*a* for the embodiment 100. Thereby, the illuminating and imaging focus areas $\varphi_m$(4.1), $\varphi_m$(8) which are most of elliptical form of the focus areas formed from a certain location point of the illuminating and imaging are locating in the virtual measuring space under the surface of the object 2, and, correspondingly, the components $\varphi_m$(4.1), $\varphi_m$(8) which are most of line form of the focus areas are in focus above the object 2. Now, when astigmatism is utilized, at each coincident focus area, one illuminating focus area $\varphi_{1\rightarrow m}$(4.1) of the location point $P_1$(4.1) of the output element 4.1 coincides with (i.e. meets) one imaging focus area $\varphi_{1\rightarrow m}$(8) of one location point $P_1$(8)→$P_n$(8) of the light sensor 8 associated with the same shape and are formed with the correlated optical apertures of the illuminating optics 11 and the imaging optics 13. In this embodiment, the measuring can be realized either with one wavelength, various wavelengths or white light.

FIG. 3 shows measuring arrangement according to the embodiment 400. This embodiment differs from the previous embodiments in that the device comprises two line-like (linear) output elements, denoted with references 4.1 and 4.2, and a matrix light sensor, denoted with reference 8*b*. With the matrix light sensor 8*b* it is possible to measure the intensity of the reflected light from the object 2 in two different directions of the location points $K_1$(8*b*)→$K_n$(8*b*) and $P_1$(8*b*)→$P_n$(8*b*), and hence, a rectangular coordinate system (i.e. an orthogonal coordinate system) is formed from said location points of the light sensor 8*b*. The illuminating optics 11 and imaging optics 13 may comprise any aforementioned optical aberration in the way as stated above. Therefore, different components of the light from the location points $P_1$(4.1)→$P_n$(4.1) of the output element 4.1 and from the location points $P_1$(4.2)→$P_n$(4.2) of the output element 4.2 are focused at different distances from the illuminating optics 11. Accordingly, the imaging optics 13 is configured to form focus points or areas from the location points $K_1$(8*b*)→$K_n$(8*b*) and $P_1$(8*b*)→$P_n$(8*b*) at different distances from the imaging optics 11.

The illuminating optics 11 and the imaging optics 13 are arranged to form coincident focus points or coincident focus areas in the manner as described above. Now, when the output elements 4.1 and 4.2 both have line like geometric shape it is possible to arrange coincident focus points or focus areas by illuminating optics 11 and imaging optics 13 into lines at different depths which lines are formed from different location points of both said output elements and different location points of the light sensor 8*b*.

When longitudinal chromatic aberration is utilized in the illuminating optics 11 and imaging optics 13 there are lines of coincident focus points with common dominant wavelengths of coinciding illuminating focus points and imaging focus points at different depths in the virtual measuring space. Correspondingly, if spherical aberration is utilized there are lines of coincident focus points at different depths, which each corresponding line of coincident focus points consists of coinciding illuminating focus points and imaging focus points which are formed with the corresponding correlated (equal) optical apertures of the illuminating optics 11 and the imaging optics 13. Correspondingly, if astigmatism is utilized in illuminating optics 11 and the imaging optics 13 there are lines of coincident focus areas at different depths, which each corresponding line of coincident focus areas consists of coinciding illuminating focus areas and imaging focus areas associated with the same shape and which coinciding illuminating focus areas and imaging focus areas are formed with the corresponding correlated (equal) optical apertures of the illuminating optics 11 and the imaging optics 13.

In FIG. 3, when longitudinal chromatic aberration is utilized in the illuminating optics 11 and imaging optics 13, there are illustrated intersections of the surface of the object 2 and lines of coincident focus points, denoted as L1*a* and L1*b*. L1*a* is a line of reflections resulted from the intersections of certain object points of the surface and coincident focus points locating in a line form which are formed from the illuminating focus points of location points $P_1$(4.1)→$P_n$(4.1) of the output element 4.1 and the imaging focus points of location points $P_1$(8*b*)→$P_n$(8*b*),$K_1$(8*b*)→$K_n$(8*b*) of the light sensor 8*b*. Respectively, L2*b* is a line of reflections resulted from the intersections of certain object points of the surface and coincident focus points locating in a line form which are formed from the illuminating focus points of location points $P_1$(4.2)→$P_n$(4.2) of the output element 4.2 and the imaging focus points of location points $P_1$(8*b*)→$P_n$(8*b*),$K_1$(8*b*)→$K_n$(8*b*) of the light sensor 8*b*. In FIG. 3, there are illustrated one individual intersection from each L1*a* and L2*b* from which one intersection takes place at the coincident focus point $A_z$(4.1)$\lambda_{xy}$(8) and the other intersection takes place at the coincident focus point $A_z$(4.2)$\lambda_{xy}$(8). The coincident focus point $A_z$(4.1)$A_{xy}$(8) is formed from one of the illuminating focus points along the illuminating coordinate axis $A_z$(4.1) associated with the principal ray $F_z$(4.1) for the location point $P_z$(4.1) of the output element 4.1 and one of the imaging focus points along the imaging coordinate axis $A_{xy}$(8$b$) associated with the principal ray $F_{xy}$(8$b$) for the location point $P_x$(8$b$)$K_y$(8$b$) of the light sensor 8$b$. Respectively, the coincident focus point $A_z$(4.2)$A_{xx}$(8) is formed from one of the illuminating focus points along the illuminating coordinate axis $A_z$(4.2) associated with the principal ray $F_z$(4.2) for the location point $P_z$(4.2) of the output element 4.2 and one of the imaging focus points along the imaging coordinate axis $A_{xx}$(8$b$) associated with the principal ray $F_{xx}$(8$b$) for the location point $P_x$(8$b$)$K_x$(8$b$) of the light sensor 8$b$. Like any other coincident focus points according to the present disclosure also each of numerous coincident focus points of the embodiment 300 are each associated with the same wavelength of the certain coinciding illuminating focus point and imaging focus point.

The intersection of the surface of the object 2 at the location of the coincident focus point $A_z$(4.1)$A_{xy}$(8) generates a reflection of the light originated from the output element location $P_z$(4.1) from which part of the reflected light is collected onto the location point $P_x$(8$b$)$K_y$(8$b$) of the light sensor 8$b$, generating a local maximum to the formed reflection data. Respectively, the intersection of the surface of the object 2 at the location of the coincident focus point $A_z$(4.2)$A_{xx}$(8) generates a reflection of the light originated from the output element location $P_z$(4.2) from which part of the reflected light is collected onto the location point $P_x$(8$b$)$K_x$(8$b$) of the light sensor 8$b$, generating a local maximum to the formed reflection data. In the same manner, a local maximum is formed from the other intersections of L1$a$ and L1$b$ as illustrated corresponding lines on the light sensor 8$b$.

In various embodiments, the device comprises a plurality of line-like or point-like output elements 4.1→4.$n$ or combinations thereof.

In embodiments which comprises various output elements, the illuminating optics 11 is configured to focus light from each of the location points $P_1$→$P_n$ for each of the output elements 4.1→4.$n$ on a plurality of illuminating focus points or focus areas positioned at different distances from the illuminating optics 11 along the corresponding illuminating coordinate axis $A_1$→$A_n$. Each of these axes is associated with the corresponding principal ray $F_1$→$F_n$ of the illuminating optics 11 for the corresponding location point $P_1$→$P_n$ of the corresponding output element 4.1→4.$n$. The corresponding principal ray $F_1$→$F_n$ is the mutual for the plurality of illuminating focus points or focus areas focused from the corresponding location point $P_1$→$P_n$ of the corresponding output element 4.1→4.$n$. Each of the illuminating focus points or focus areas along the same corresponding illuminating coordinate axis $A_1$→$A_n$ for the corresponding location point $P_1$→$P_n$ of the corresponding output element 4.1→4.$n$ differs from each other at least in the dominant wavelength or shape and/or is formed with a different optical aperture of the illuminating optics 11.

Furthermore, the illuminating optics 11 and imaging optics 13 are configured to form a plurality of coincident focus points or focus areas so that each of the various focus points or focus areas from the plurality of illuminating focus points or focus areas along the same corresponding illuminating coordinate axis $A_1$→$A_n$ for each of the output elements 4.1→4.$n$ coincides at a coincident focus point or focus area with an imaging focus point or focus area positioned along a different imaging coordinate axis $A_1$(8)→$A_n$(8), where the orientations of the illuminating coordinate axes $A_1$→$A_n$ for each of the output elements 4.1→4.$n$ are different from the orientations of the imaging coordinate axes $A_1$(8)→$A_n$(8).

In various embodiments longitudinal chromatic aberration is utilized in the illumination optics 11 to focus light from each of the location points $P_1$→$P_n$ for each of the output elements 4.1→4.$n$ on a plurality of illuminating focus points positioned at different distances from the illuminating optics 11 along the corresponding illuminating coordinate axis $A_1$→$A_n$ are associated with the corresponding principal ray $F_1$→$F_n$ of the illuminating optics 11 for the corresponding location point $P_1$→$P_n$ of the corresponding output element 4.1→4.$n$ so that each of the illuminating focus points along the same illuminating coordinate axis $A_1$→$A_n$ differs in the dominant wavelength. Correspondingly, longitudinal chromatic aberration is provided in the imaging optics 13 to form from each of the location points $P_1$(8)→$P_n$(8) of the light sensor 8 a plurality of imaging focus points positioned at different distances from the imaging optics 13 along the corresponding imaging coordinate axis $A_1$(8)→$A_n$(8) associated with the corresponding principal ray $F_1$(8)→$F_n$(8) of the imaging optics 13 for the corresponding location point $P_1$(8)→$P_n$(8) of the light sensor 8 so that each of the focus points along the same imaging coordinate axis $A_1$(8)→$A_n$(8) differs in the dominant wavelength.

In those embodiments where a matrix light sensor is used, each imaging coordinate axis, principal ray and location point may be associated with the coordinate system of location points of the light sensor 8$b$ like described for the embodiment 400.

When longitudinal chromatic aberration is provided in the illumination optics 11 and the imaging optics 13, each of the coincident focus points consists of an illuminating focus point and an imaging focus point associated with the common dominant wavelength.

In various embodiments spherical aberration is provided in the illuminating optics 11 to focus light from each of the location points $P_1$→$P_n$ for each of the output elements 4.1→4.$n$ on a plurality of imaging focus points positioned at different distances from the illuminating optics 11 along the corresponding illuminating coordinate axis $A_1$→$A_n$ associated with the corresponding principal ray $F_1$→$F_n$ of the illuminating optics 11 for the corresponding location point $P_1$→$P_n$ of the corresponding output element 4.1→4.$n$ so that each of the illuminating focus points along the same illuminating coordinate axis $A_1$→$A_n$ is formed with a different optical aperture of the illuminating optics 11. Correspondingly, spherical aberration is provided in the imaging optics 13 to form from each of the location points $P_1$(8)→$P_n$(8) of the light sensor 8 a plurality of imaging focus points positioned at different distances from the imaging optics 13 along the corresponding imaging coordinate axis $A_1$(8)→$A_n$(8) associated with the corresponding principal ray $F_1$(8)→$F_n$(8) of the imaging optics 13 for the corresponding location point $P_1$(8)→$P_n$(8) of the light sensor 8 so that each of the focus points along the same imaging coordinate axis $A_1$(8)→$A_n$(8) is formed with a different optical aperture of the imaging optics 13.

When spherical aberration is provided in the illumination optics 11 and the imaging optics 13, each of the coincident focus point is formed with the correlated optical apertures of the illuminating optics 11 and the imaging optics 13.

In various embodiments astigmatism is provided in the illuminating optics 11 to focus light from each of the location points $P_1$→$P_n$ for each of the output elements 4.1→4.$n$ on a plurality of illuminating focus areas with different shapes positioned at different distances from the illuminating optics 11 along the corresponding illuminating coordinate axis $A_1$→$A_n$ associated with the corresponding principal ray $F_1$→$F_n$ of the illuminating optics 11 for the corresponding location point $P_1$→$P_n$ of the corresponding output element 4.1→4.$n$ so that each of the illuminating focus areas along the same illuminating coordinate axis $A_1 \rightarrow A_n$ is formed with the different optical apertures of the illuminating optics 11. Correspondingly, astigmatism is provided in the imaging optics 13 to form from each of the location points $P_1(\mathbf{8}) \rightarrow P_n(\mathbf{8})$ of the light sensor 8 a plurality of imaging focus areas with different shapes positioned at different distances from the imaging optics 13 along the corresponding imaging coordinate axis $A_1(\mathbf{8}) > A_n(\mathbf{8})$ associated with the corresponding principal ray $F_1(\mathbf{8}) \rightarrow F_n(\mathbf{8})$ of the imaging optics 13 for the corresponding location point $P_1(\mathbf{8}) \rightarrow P_n(\mathbf{8})$ of the light sensor 8 so that each of the focus areas along the same imaging coordinate axis $A_1(\mathbf{8}) \rightarrow A_n(\mathbf{8})$ is formed with the different optical apertures of the imaging optics 13.

When astigmatism is provided in the illumination optics 11 and the imaging optics 13, each of the coincident focus area consists of an illuminating and imaging focus area associated with the common shape and is formed with the correlated optical apertures of the illuminating optics 11 and the imaging optics 13.

FIGS. 4*a* and 4*b* show examples of spectral content of collected light, showing intensity (I) of collected light as a function of wavelength (λ) in such a case where longitudinal chromatic aberration is utilized in the illuminating optics 11 and imaging optics 13. In FIG. 4*b* is an example spectrum from the location point of the light sensor 8 onto which is collected light from the reflection generated in the intersection of the object 2 and one of the coincident focus point. There is a very clear maximum with one certain wavelength $\lambda_p$ in the spectrum of FIG. 4*b*, which indicates that it is a particular wavelength of light that reflects from the intersection of the object 2 and the coincident focus point, revealing information about optical properties of the object 2. Whereas the intensity of that wavelength $\lambda_p$ from which the light measured of the intersection mainly consists of is strongly attenuated in a spectrum of light collected from a location point of the light sensor 8 when said location point is close to the location point on the light sensor 8 where light from the intersection is collected. The spectrum of light collected from such a location point is shown in FIG. 4*a* where the spectrum of the collected light has a very clear attenuation in the place of the wavelength $\lambda_p$ that is mainly concentrated in the maximum of the spectrum of light reflected from the intersection.

In the measurement of optical properties intensity of the local maximum is determined in certain object point of the object under measurement. The intensity of the local maximum is proportional to the reflectivity of the object point from which the local maximum is determined. Furthermore, in the cases where the object point is on the surface of the object, by determining the intensity of the local maxima it is obtained information about reflectivity of the surface.

When longitudinal chromatic aberration is utilized in the illuminating optics 11 and imaging optics 13, it is possible to calibrate the location of the coincident focus point in the measuring space and the wavelength of the associated local maximum whereby by measuring the position of the object, like the surface height, it is obtained information about reflectivity of the object from that position in specific, known wavelength. Furthermore, when the device comprises various output elements there are various measuring geometries whereby by said various measuring geometries it is possible to measure simultaneously the object by using diversity of wavelengths.

FIG. 5*a* is shown an embodiment 500 that comprises two point-like output elements, denoted with references 4.1 and 4.2. The embodiment 500 further utilizes longitudinal chromatic aberration in the illuminating optics 11 and imaging optics 13, whereby numerous coincident focus points are formed at different heights and each of coincident focus points consists of an illuminating and imaging focus point associated with the common dominant wavelength as described above. In FIG. 5*a* there are illustrated illuminating focus points formed from two location points $P_1(\mathbf{4.1})$ and $P_1(\mathbf{4.2})$ of the output elements and imaging focus points formed from two location points $P_w(\mathbf{8})$ and $P_q(\mathbf{8})$ of the light sensor 8 with five different wavelengths $\lambda_1$-$\lambda_5$ at different depths in z-direction. Furthermore, there are illustrated four different coincident focus points which are consisted of some of these illuminating and imaging focus points, i.e., $A_1(\mathbf{4.2})\lambda_q(\mathbf{8})$ with $\lambda_1$, $A_1(\mathbf{4.1})A_q(\mathbf{8})$ with $\lambda_2$, $A_1(\mathbf{4.2})A_w(\mathbf{8})$ with $\lambda_2$ and $A_1(\mathbf{4.1})A_w(\mathbf{8})$ with $\lambda_4$.

In FIG. 5*a* is further shown two different possible surface heights $h_a$ and $h_b$ for the object 2 to be measured. When the object 2 has the surface height at height $h_a$ there occurs two intersections. One intersecting coincident focus point at $h_a$ is $A_1(\mathbf{4.1})A_q(\mathbf{8})$ that is consisted of one of the illuminating focus points formed from the location point $P_1(\mathbf{4.1})$ of the output element 4.1 and one of the illuminating focus point formed from the location point $P_w(\mathbf{8})$ of the light sensor 8. Another intersecting coincident focus point at $h_a$ is $A_1(\mathbf{4.2})$ $A_w(\mathbf{8})$ that is consisted of one of the illuminating focus point formed from the location point $P_1(\mathbf{4.2})$ of the output element 4.2 and one of the imaging focus point formed from the location point $P_w(\mathbf{8})$ of the light sensor 8. Both of these intersections produce a local maximum to the intensity distribution which is shown in FIG. 5*b*1. The local maximum $h_a(\mathbf{2.2}a)$ that corresponds to the location point $P_w(\mathbf{8})$ on the sensor 8 is a result of the intersection of the object point 2.1*a* and the coincident focus point $A_1(\mathbf{4.1})\lambda_q(\mathbf{8})$. Correspondingly, the local maximum $h_a(\mathbf{2.1}a)$ that corresponds to the location point $P_q(\mathbf{8})$ on the sensor 8 is a result of the intersection of the object point 2.2*a* and the coincident focus point $\lambda_1(\mathbf{4.2})A_w(\mathbf{8})$.

When the object 2 has the surface height at $h_b$ there occurs an intersection of the surface and the virtual measuring space at the position of object point 2.1*b* and coincident focus point $A_1(\mathbf{4.1})A_w(\mathbf{8})$. This intersection generates a local maximum, shown in FIG. 5*b*2, at the same location point $P_w(\mathbf{8})$ of the light sensor 8 as the intersection of the coincident focus point $A_1(\mathbf{4.2})A_w(\mathbf{8})$ described above. In order to determine the position of the intersection and further the position of the object point the device of the embodiment 500 is configured to resolve from which location point of the output elements, either 4.1 or 4.2 in this example, the light collected from the reflection of the intersection is originated. Since the local maximum of the light reflected from the intersection of the object 2 and one of the coincident focus point consists mainly of one dominant wavelength, the device can by determining the wavelength of the local maximum to determine from which output element, either 4.1 or 4.2 in this example, the light of the local maximum is originated. This can be done such that for each positions of the coincident focus points associated with different location points $P_1 \rightarrow P_n$ of the output elements 4.1→4.*n* is calibrated to correspond unambiguously a certain wavelength $\lambda_1 \rightarrow_m$. Hence, in the example of FIG. 5*a*, the local maximum corresponding the location point $P_w(\mathbf{8})$ of the light sensor 8 with the wavelength $\lambda_2$ unambiguously corresponds to the location point $P_1(\mathbf{4.2})$ of the output element 4.2. Correspondingly, the local maximum corresponding the location point $P_w(\mathbf{8})$ of the light sensor 8 with the wavelength $\lambda_4$ unambiguously corresponds to the location point $P_1(\mathbf{4.1})$ of the output element 4.1.

In one embodiment, the wavelength of the local maximum can be determined such that the light sensor 8 is an RGB camera.

An embodiment which comprises more than one output elements 4.1→4.*n* and utilizes longitudinal chromatic aberration in the illuminating optics 11 and imaging optics 13, the device is configured to determine the wavelength of the local maximum of the intensity distribution of the light detected by the light sensor 8 to distinguish from which output element 4.1→4.*n* the light of the local maximum is provided to determine the position of the intersected object point 2.1. The light sensor 8 may be an RGB camera that is configured to determine the wavelength of the local maximum.

In various embodiments the light sensor 8 may be a CCD or CMOS sensor or the like.

The device can be called also as a measuring device, an imaging device, a triangulating device or an optical device.

The output element of the device can be called also as an illuminating element or light source element.

The distribution of the coincident focus points defines a measuring space for determining the position of an object point 2.1 of the object 2 being measured.

In an embodiment the position of an object point of the object (2) being measured is determined for at least one of the x, y or z coordinates of the xyz coordinate system associated with the distribution of the coincident focus points.

Figure 6A:
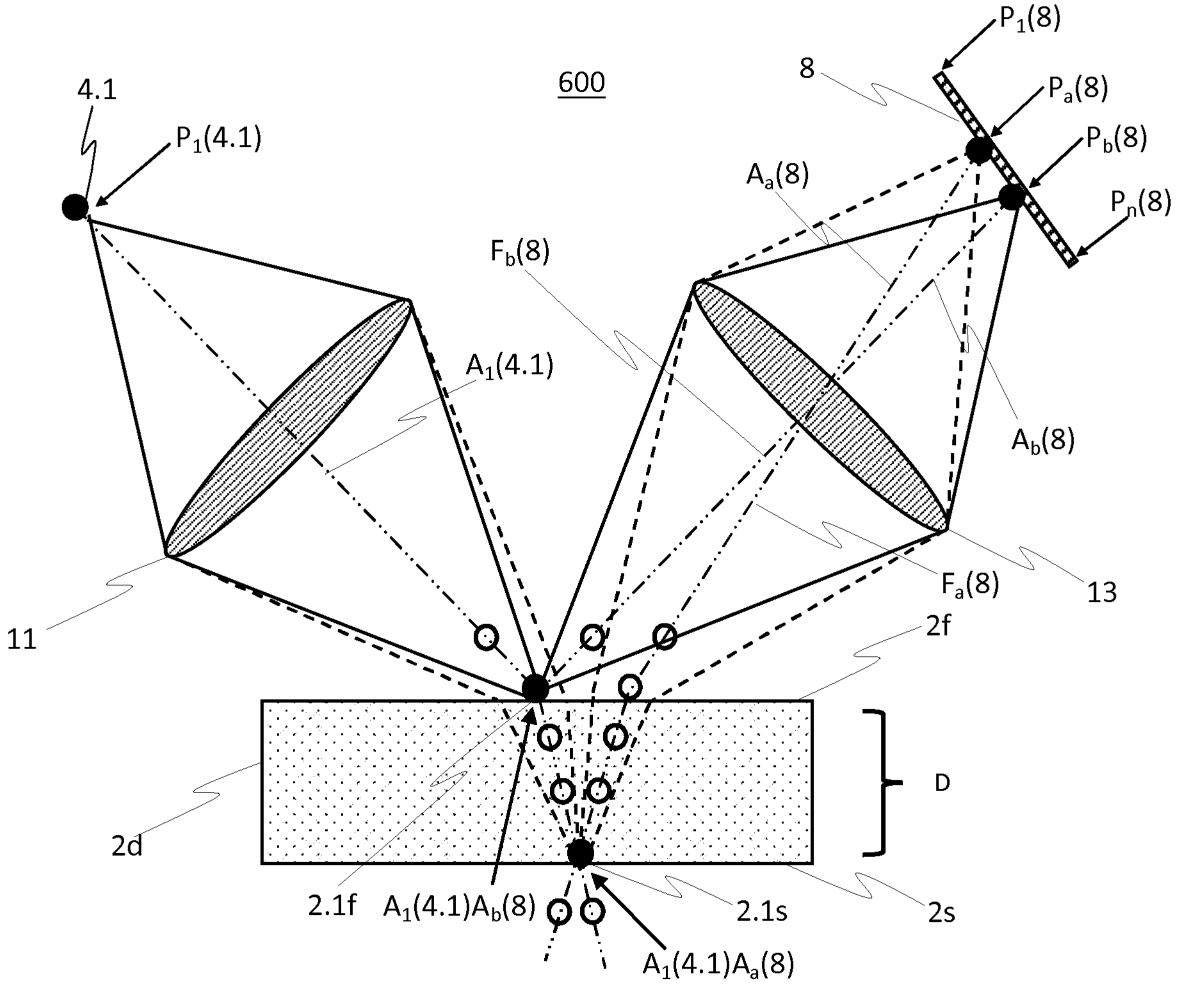
FIG. 6*a* illustrates schematically an embodiment of a device for determining a position and/or optical properties of an object.

FIG. 6*a* shows an embodiment 600 of measuring of the thickness of an object 2*d* that is at least partially transparent or translucent for the light being directed to the object (2). The object 2*d* comprises two surfaces of which between each other is the thickness D of the object at a certain position. In the example of FIG. 6*a*, a first surface is denoted with 2*f* and a second surface is denoted with 2*s*. The embodiment 600 can be utilized with any optical aberrations in the illuminating optics 11 and imaging optics 13 and the position of the intersecting object points of the object 2*d* are measured in the manner as described above.

Figure 6B:
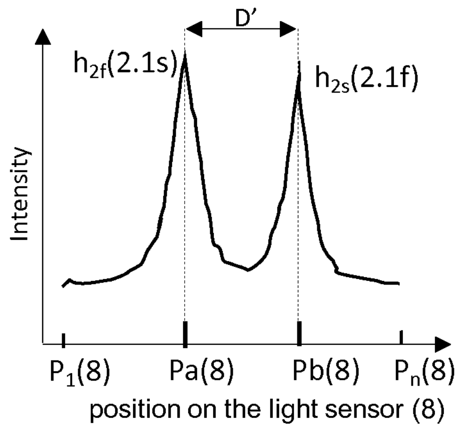
FIG. 6*b* illustrates an exemplary intensity distribution diagram in accordance with FIG. 6*a;*

FIG. 6*b* shows an example of a signal according to the example of FIG. 6*a*, received from the light sensor 8 of the device. One local maximum signal $h_{2f}$(2.1*s*) is caused by a reflection from the object point 2.1*f* of the upper surface 2*f* (i.e. an intersection of the object point 2.1*f* and the coincident focus point $A_1$(4.1)$A_b$(8)). Another local maximum signal $h_{2s}$(2.1*f*) is a result of a reflection coming from the object point 2.1*s* of the lower surface (i.e. an intersection of the object point 2.1*s* and the coincident focus point $A_1$(4.1) $A_a$(8)). The thickness D of the object at location of these object points 2.1*f* and 2.1*s* can be determined from the distance D' of said local maxima when the refraction index of the object being measured and the measurement geometry are known.

In one embodiment, a thickness between a first surface (2*f*) and a second surface (2*s*) of the object (2) that is at least partially transparent or translucent for the light being directed to the object (2) is determined from the position difference between the local maximum of the intensity distribution of the detected light on the light sensor 8 that is a result from the first surface (2*f*) and the local maximum of the intensity distribution of the detected light on the light sensor 8 that is a result from the second surface (2*s*).

Figure 7A:
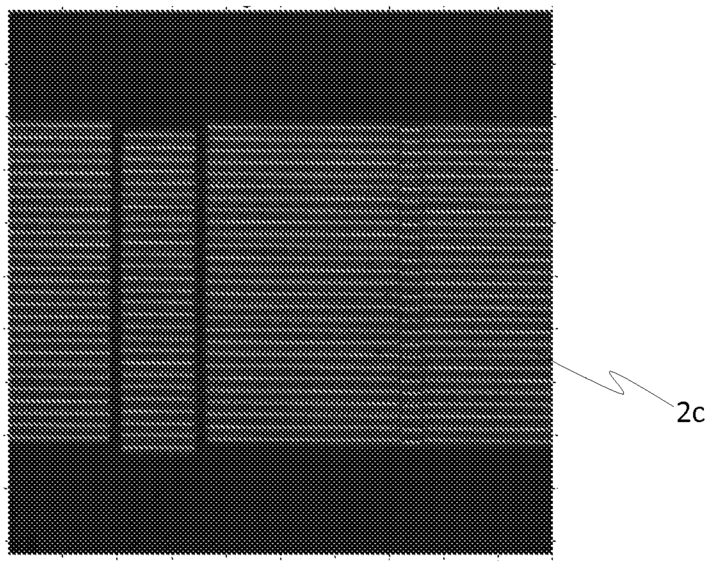
FIGS. 7*a*, 7*b*, 7*c* illustrate an example of simultaneously measured surface profiles of the object determined according to the invention.
Figure 7B:
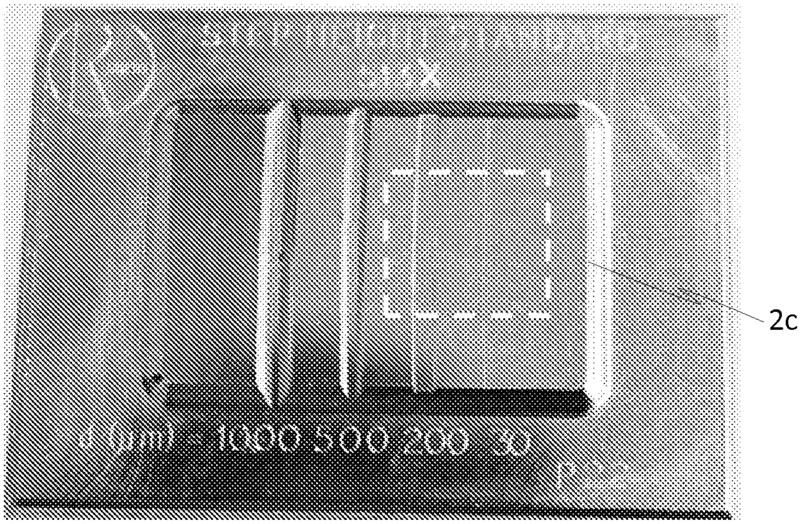
Figure 7C:
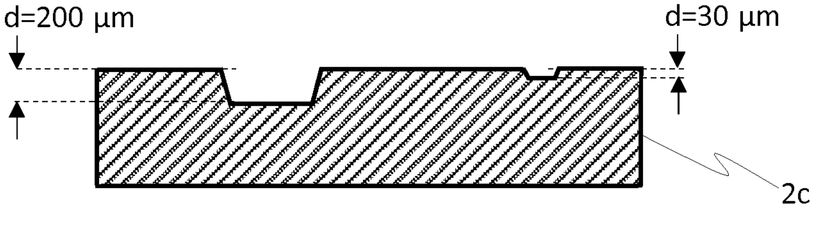

FIG. 7*a* shows an example of an intensity distribution on the matrix camera type of sensor 8 when a surface of the object 2*c* measured according to the invention. The areas that have higher illumination intensity are shown as lighter areas. In FIG. 7*a* each of these horizontal areas which are lighter than the background in the single image frame are results of simultaneous intersections of the surface and different lines comprising different coincident focus points measured in the manner as described above. This exemplary measurement consisted of illuminating of 27 line-like output elements. In FIG. 7*a* the discontinuities of the lines come from the changes in the surface profile according to the measured object 2*c*. Each of the 27 lines have measured simultaneously from different surface parts of 2*c*. In FIG. 7*b* the imaged area of 2*c* is illustrated with dashed lines. FIG. 7*c* shows a schematic sideview of the object 2*c* exemplifying the measured surface profile.

Figure 8:
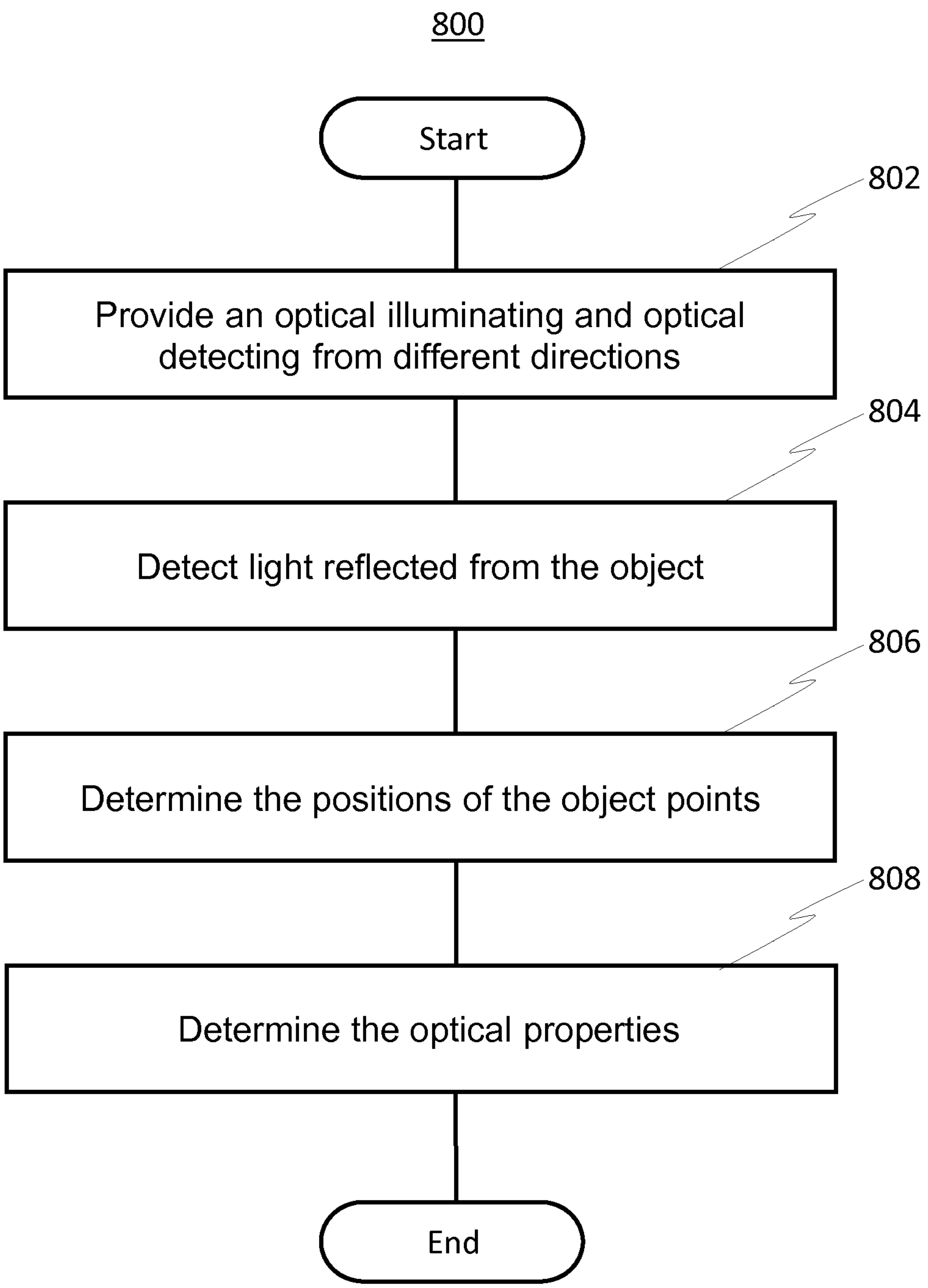
FIG. 8 is a flow diagram disclosing an embodiment of a method for determining a position and/or optical properties of an object.

FIG. 8 shows a flowchart of a method according to an exemplifying and nonlimiting embodiment 800. The method comprises the following steps:

step 802: provide an optical illuminating and optical detecting of the object from different directions, step 804: detect light reflected from the object, step 806: determine the positions of the object points, and step 808: determine the optical properties.

At 802, light is focused from each of the location points for each of the output elements on illuminating focus points or focus areas positioned at different distances from the illuminating optics along the corresponding illuminating coordinate axis associated with the corresponding principal ray of the illuminating optics for the corresponding location point of the corresponding output element. The corresponding principal ray is the mutual for the plurality of illuminating focus points or focus areas focused from the corresponding location point of the corresponding output element. Each of the illuminating focus points or focus areas along the same corresponding illuminating coordinate axis for the corresponding location point of the corresponding output element differs from each other at least in the dominant wavelength or shape and/or is formed with a different optical aperture of the illuminating optics.

Further at 802, a plurality of different imaging focus points or focus areas are formed from each of the location points of the light sensor at different distances from the imaging optics along an imaging coordinate axis associated with a corresponding principal ray of the imaging optics for the corresponding location point of the light sensor. The corresponding principal ray is the mutual for the plurality of imaging focus points formed from the corresponding location point of the light sensor. Each of the imaging focus points or focus areas along the same imaging coordinate axis differs from each other at least in the dominant wavelength or shape and/or is focused with a different optical aperture of the imaging optics.

Further at 802, a plurality of coincident focus points or focus areas are formed so that each of the various focus points or focus areas from the plurality of illuminating focus points or focus areas along the same corresponding illuminating coordinate axis for each of the output elements coincides at a coincident focus point or focus area with an imaging focus point positioned along a different imaging coordinate axis. The orientations of the illuminating coordinate axes for each of the output elements are configured to be different from the orientations of the imaging coordinate axes. Each of the coincident focus points or focus areas consists of an illuminating and imaging focus point or focus area associated with the common dominant wavelength or shape and/or is formed with the correlated optical apertures of the illuminating optics and the imaging optics.

At 804, the intensity values of the light collected from the object by the imaging optics is detected.

At 806, the positions of the object points are determined from the locations of the local maxima of the intensity distribution of the detected light.

At 808, the optical properties of the object points are determined from the intensities or the wavelengths of the of the local maxima of the intensity distribution of the detected light.

Steps 806 and 808 are optional steps from which either 806 or 808, or alternatively both 806 and 806 can be accomplished.

It is obvious for someone skilled in the art that the measuring process can be returned back to step 802 whereby a continuous measuring process is produced.

In a method according an embodiment, the method comprises a step of determining a thickness between a first surface and a second surface of the object that is at least partially transparent or translucent for the light being directed to the object from the position difference between an object point on the first surface of the object and an object point on the second surface of the object.

In a method according an embodiment, the method comprises a step where the illuminating optics focuses each of the illuminating focus points along the same corresponding illuminating coordinate axis for the corresponding location point of the corresponding output element differing from each other at least in the dominant wavelength by using longitudinal chromatic aberration. Further, the imaging optics focuses each of the imaging focus points or focus areas along the same imaging coordinate axis differing from each other at least in the dominant wavelength by using longitudinal chromatic aberration.

In a method according an embodiment, the method comprises a step where the illuminating optics focuses each of the illuminating focus points along the same corresponding illuminating coordinate axis for the corresponding location point of the corresponding output element with different optical apertures of the illuminating optics by using spherical aberration. Further, the imaging optics focuses each of the imaging focus points along the same imaging coordinate axis with different optical apertures of the imaging optics by using spherical aberration.

In a method according an embodiment, the method comprises a step where the illuminating optics focuses each of the illuminating focus areas along the same corresponding illuminating coordinate axis for the corresponding location point of the corresponding output element differing from each other in shape by using astigmatism. Further, the imaging optics focuses each of the imaging focus areas along the same imaging coordinate axis differing from each other in shape by using astigmatism.

In a method according an embodiment, the method comprises a step where arranging the light sensor substantially perpendicular to an optical axis of the imaging optics, and disposing a plurality of output elements on a plane surface. The plane surface forms an oblique angle to an optical axis of the illuminating optics, preferably wherein the plurality of output elements consists of a plurality of line-like output elements.

Figure 9:
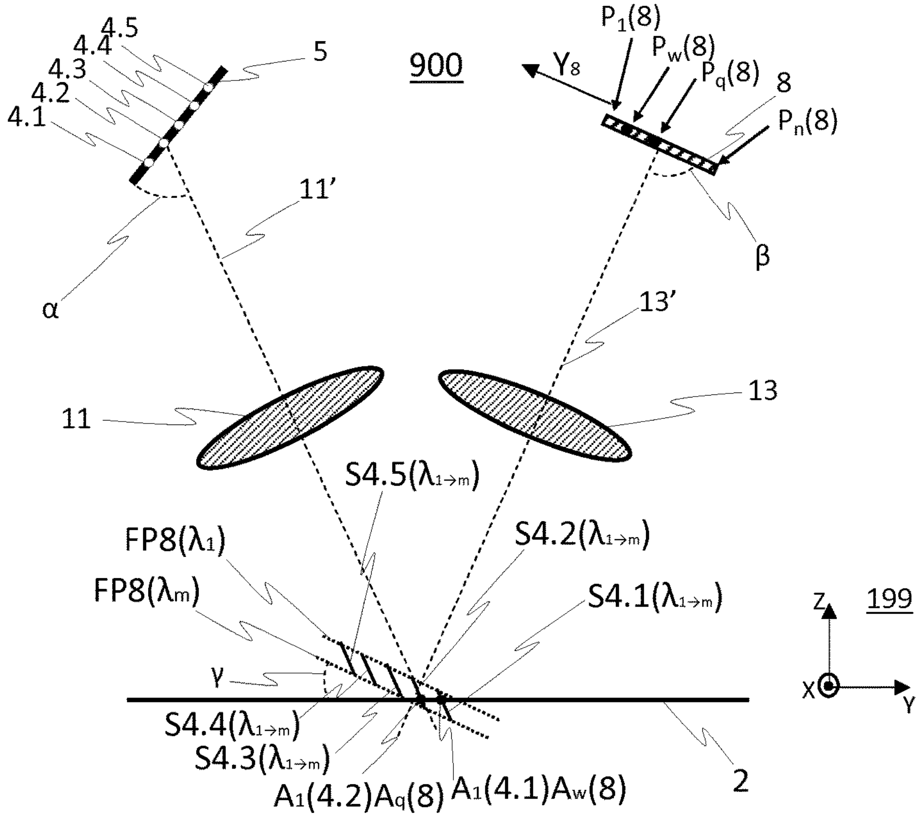
FIGS. 9-10 illustrate schematically a further variation of a device in accordance with the present invention.
Figure 10:
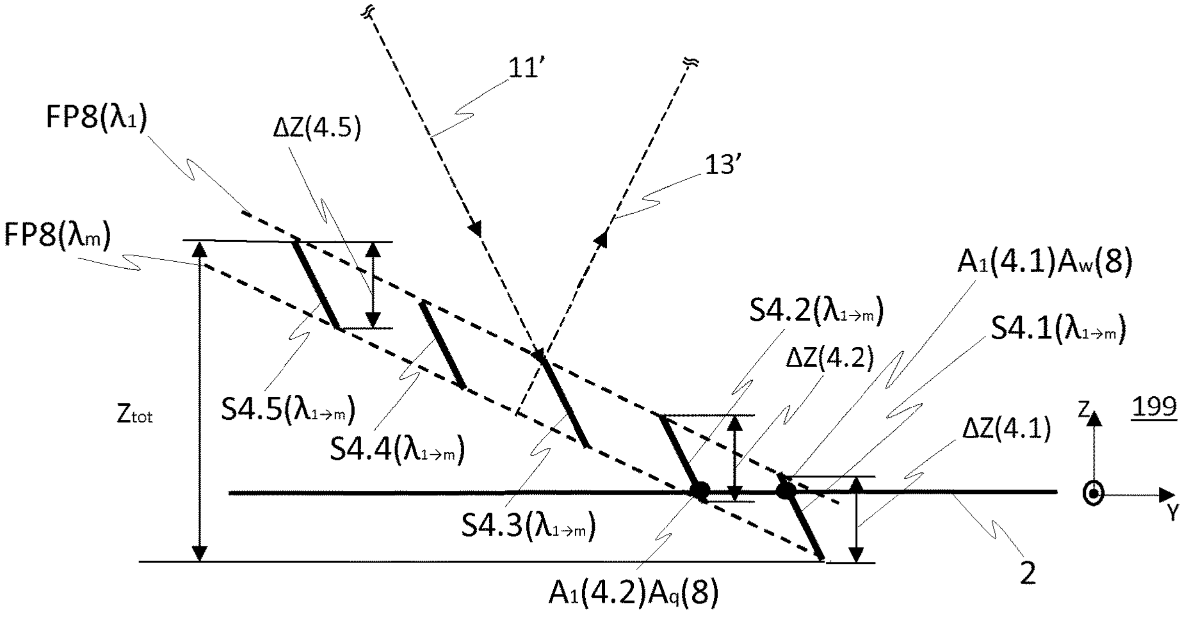

FIGS. 9 and 10 show a further embodiment 900. In this embodiment the device comprises more than one output elements. In the FIG. 9 the device 900 comprises five output elements 4.1→4.5 but the number of output elements may be varied depending on the application. Furthermore, the output elements can be line-like or point-like output elements or combinations thereof as mentioned herein elsewhere.

If the output elements 4.1→4.5 are line-like output elements those extend in x-direction in the coordinate system 199 of the device.

The output elements are disposed on a plane surface 5 aligned each other. In this embodiment 900 the plane surface 5 comprising said more than one output elements is disposed in an oblique angle α respect to an optical axis 11' of the illuminating optics 11. The light sensor 8 that can be either a line sensor or a matrix sensor depending on the application is disposed substantially perpendicular angle β respect to an optical axis 13' of the imaging optics 13, as shown in FIG. 9. If the light sensor 8 is a line sensor it is disposed advantageously on the YZ-plane, as shown in FIG. 9.

Illuminating and imaging focus points and coincident focus points formed from those illuminating and imaging focus points are provided similarly as in the previous embodiments from location points of each output elements 4.1→4.5 by providing longitudinal chromatic aberration in the illuminating optics 11 and imaging optics 13. Alternatively, spherical aberration or astigmatism or any combination of these three alternatives to form focus points and areas can be used in the device 900.

In the device 900 of FIG. 9, due to the angle β, the imaging focus points formed from different location points P1(8)→P8(*n*) of the light sensor 8 are arranged into a set focal planes FP8(λ1→$\lambda_m$) that are in tilted angle ϕfin respect to Y-direction of the coordinate system 199. The coincident focus points between a certain illuminating and imaging focus points are formed (i.e. matched) by tilting the plane surface 5 into the angle β so that the illuminating focus points formed from different location points of each output elements 4.1→4.5. are matched with a certain imaging focus points having the same wavelength. Consequently, the coincident focus points are formed so that the illuminating focus points of each output element are matched with the respective imaging focus points at least partially in different height (i.e. with different Z-coordinates) compared to the coincident focus points that are associated with other output elements. This is illustrated in FIG. 9 where subsequent coincident focus points associated with illumination focus points along the same illuminating axis (principal ray) formed from one location point from each output element 4.1, 4.2, 4.3, 4.4 and 4.5, are illustrated as lines, denoted as S4.1(λ1→m), S4.2(λ1→m), S4.3(λ1→m), S4.4(λ1→m), and S4.5(λ1→m). These lines of coincident focus points are arranged at least partially in different heights in Z-direction. The coincident focus points are formed from illumination focus points and imaging focus points which are in between the focal plane FP8(λ1) of the shortest wavelength λ1 and the focal plane FP8(λm) of the longest wavelength λm. Consequently, a distribution of a plurality of coincident focus points is formed between the focal planes FP8(λ1) and FP8(λm), where FP8(λ1) is the closest focal plane to the imaging optics 13 and the focal plane FP8(λm) is the furthest focal plane to the imaging optics 13, respectively. In the distribution of coincident focus points there are spatially separated lines S4.1(λ1→m), S4.2(λ1→m), S4.3(λ1→m), S4.4(λ1→m) and S4.5(λ1→m) of coincident focus points associated with different output elements 4.1, 4.2, 4.3, 4.4 and 4.5, respectively. Each of these lines provides a contribution to the total depth of field of the coincident focus points in Z-direction. This means that a total usable Z-range of the measuring space defined by the coincident focus points is larger compared to a case where there is only one output element 4.1 or to a case where all lines of coincident focus points associated with different output elements are arranged to have similar Z-coordinates.

FIG. 10 shows an enlarged portion of the measuring space of FIG. 9. In FIG. 10 the total Z-range of the measuring space of the device 900 is depicted as Ztot. The uppermost coincident focus point (i.e. having the highest Z-coordinate) locates on the line S4.5(λ1→m), having a dominant wavelength. Respectively, the lowest coincident focus point (i.e. having the lowest Z-coordinate) of the measuring space of device 900 of FIGS. 9 and 10 locates on the line S4.1 (λ1→m), having a dominant wavelength λm. λZ(4.1), λZ(4.2), λZ(4.3), λZ(4.4) and λZ(4.5) depict measuring (sub)ranges in Z-direction defined by the coincident focus points on the lines of coincident focus points S4.1(λ1→m), S4.2(λ1→m), S4.3(λ1→m), S4.4(λ1→m) and S4.5 (λ1→m), respectively. These measuring (sub)ranges may partially overlap in Z-direction, as in the figure. Consequently, the Ztot of the device 900 consists of these (sub) ranges.

In FIGS. 9 and 10 there is illustrated also an object 2 with a planar surface. In the figures there are two intersections of the surface of the object 2 with the coincident focus points that have different Y-coordinates and different dominant wavelengths. One intersection occurs with the coincident focus point of A1(4.2)Aq(8) in the line S4.2(λ1→m). λ1(4.2)Aq(8) is a coincident focus point where an illuminating focus point λ1(4.2) formed from the location point P1(4.2) of the output element 4.2 is matched with an illuminating focus point Aq(8) formed from the location point Pq(8) of the light sensor 8. Respectively, another intersection shown in FIGS. 9 and 10 occurs with the coincident focus point of λ1(4.1)Aw(8) in the line S4.1 (λ1→m). A1(4.1)Aw(8) is a coincident focus point where an illuminating focus point λ1(4.1) formed from the location point P1(4.1) of the output element 4.1 is matched with an illuminating focus point Aq(8) formed from the location point Pq(8) of the light sensor 8.

As in other embodiments of this disclosure also in the device 900 each output element 4.1→4.*n* are calibrated separately such that each positions of the coincident focus points associated with different location points $P_1$→$P_n$ of the output elements 4.1→4.*n* corresponds a certain wavelength λ1→m and a certain location point on the light sensor 8.

In the device 900 the coincident focus points are restricted between the focal plane FP8(λ1) of the shortest wavelength λ1 and the focal plane FP8(λm) of the longest wavelength λm. This restriction of the coincident focus points between those focal planes can be done in various ways. For example, a (band-pass) filter can be disposed in front of the output elements 4.1→4.*n* to restrict the light emitted therefrom. Alternatively or additionally, a (band-pass) filter can be disposed in front of the light sensor 8 to restrict the light detected thereon. Alternatively, the output elements 4.1→4.*n* can be configured to emit light only in wavelengths which are within the restricted range of λ1-λm.

Since the total Z-measurement range of the device 900 consists of subranges associated with individual output elements the total Z-measurement range can be controlled by the number of the output elements 4.1→4.*n*.

It is possible to adjust the spacing of the adjacent output elements in such a way that the coincident focus points cover the whole Z-range of the measuring space. Further it is possible to adjust the spacing of the adjacent output elements in such a way that there are at least two different coincident focus points for each height position (i.e. Z-coordinate) of the measuring space.

There are various advantages that can be achieved with the device 900. One advantage is that it may simplify the imaging optics 13 and also may improve the quality of the imaging since the light to be detected is arranged to reach the sensor surface substantially in a straight angle.

Other advantage is that the coincident focus points can be formed with relatively large numerical apertures of the illumination and imaging optics. This makes possible to measure glossy, tilted surfaces. As a reference, with a typical laser triangulation 3D sensor that utilizes collimated laser light to illuminate the object under the measurement, already a slightly tilted glossy surface can direct all the light outside the imaging aperture making the 3D measurement of a tilted glossy surface impossible.

Other advantage is that a total Z-measurement range of the device can be increased without increasing longitudinal chromatic aberration in the imaging and illuminating optics since the measurement range can be increased by increasing the number of the output elements. Consequently, it makes possible to increase Z-measurement range of the device whose output elements (i.e. light sources) are configured to emit light in narrow wavelength band. For example, longitudinal chromatic aberration of the imaging optics can be as short as 200 μm for providing a measurement Z-range of e.g. 4 mm.

For example, the output elements of the device can be configured to emit only blue light and hence longitudinal chromatic aberration of the optics of such a device can be adjusted for those blue wavelengths.

As described hereinabove that alternatively or additionally to the longitudinal chromatic aberration, spherical aberration and/or astigmatism can be used in the optics of the device 900. In these cases, the device can be realized similarly as shown in the example of FIGS. 9 and 10 that utilizes longitudinal chromatic aberration to form the measuring space defined by the distribution of coincident focus points. Coincident focus points, when spherical aberration is utilized, and coincident focus areas, when astigmatism is utilized, can be formed as described hereinabove. Further, the restriction of the coincident focus points or areas between the lowest and the highest focal plane of the light sensor 8 can be done by restricting optical apertures of the optics and/or by the design of the optics as appreciated by the skilled person.

As in other embodiments of this disclosure utilizing spherical aberration or astigmatism each output element 4.1→4.*n* of the device can be calibrated separately such that each positions of the coincident focus points or areas associated with different location points P1→Pn of the output elements 4→14.*n* is calibrated to correspond a certain correlated optical apertures of the illuminating and imaging optics and a certain location point on the light sensor 8.

In an embodiment, the light sensor 8 is a line scan camera or a matrix camera being disposed substantially perpendicular to an optical axis 13 of the imaging optics 13 and the plurality of output elements 4.1→4.*n* being disposed on a plane surface 5, wherein the plane surface 5 forms an oblique angle to an optical axis 11' of the illuminating optics 11.

In order to acquire a surface profile or topography for the object under the measurement the object has to be scanned through the measuring space of the device. The surface profile is then producible as a reconstruction of position measurements (i.e. height or Z-coordinate) of individual object points of the object 2. If a 3D measurement for the object is desired the device comprise advantageously at least one line-like elements 4.1→4.5. The design of the device concerned how many and which kind of output elements 4.1→4.5 the device includes depends on the application. What is relevant in acquiring a surface measurement is that the design of the output elements 4.1→4.5 of the device is such that all object points which are wanted to be measured intersect at least one coincident focus point or area.

The scanning measurement can be actualized in such a way that the object to be measured is moved (i.e. scanned) through the measuring space defined by coincident focus points or areas of the device. In this kind of scanning the object can be moved by a linear actuator or a conveyor or the like, for example. Alternatively, the object can be kept in its place when the scanning is actualized by moving the device, for example on a rail or with aid of any other kind of moving mechanism or means, so that the object points of the surface of the object are intersected with at least one coincident focus points of the device.

The predetermined scanning path and the Z-measurement sub-ranges of the device can be adjusted so that each surface point of the object being measured will pass through at least one coincident focus point regardless of the Z-position of the object point within the Z-measurement range.

In a method according to an embodiment where the coincident focus points are formed by utilizing longitudinal chromatic aberration in the illuminating 11 and imaging optics 13, the method comprises the following step: moving the object 2 with respect to the device so that the object point 2.1 is intersected with at least one coincident focus point, wherein each of the at least one coincident focus point has the same common dominant wavelength.

In a method according to an embodiment where the coincident focus points are formed by utilizing spherical aberration in the illuminating 11 and imaging optics 13, the method comprises the following step: moving the object 2 with respect to the device so that the object point 2.1 intersected with at least one coincident focus point, wherein each of the at least one coincident focus point is formed with the correlated optical apertures of the illuminating optics 11 and the imaging optics 13.

In a method according to an embodiment where the coincident focus points are formed by utilizing spherical aberration in the illuminating 11 and imaging optics 13, the method comprises the following step: moving the object 2 with respect to the device so that the object point 2.1 intersected with at least one coincident focus area, wherein each of the at least one coincident focus area consists of illuminating and imaging focus areas associated with the common shape and is formed with the correlated optical apertures of the illuminating optics 11 and the imaging optics 13.

Figure 11:
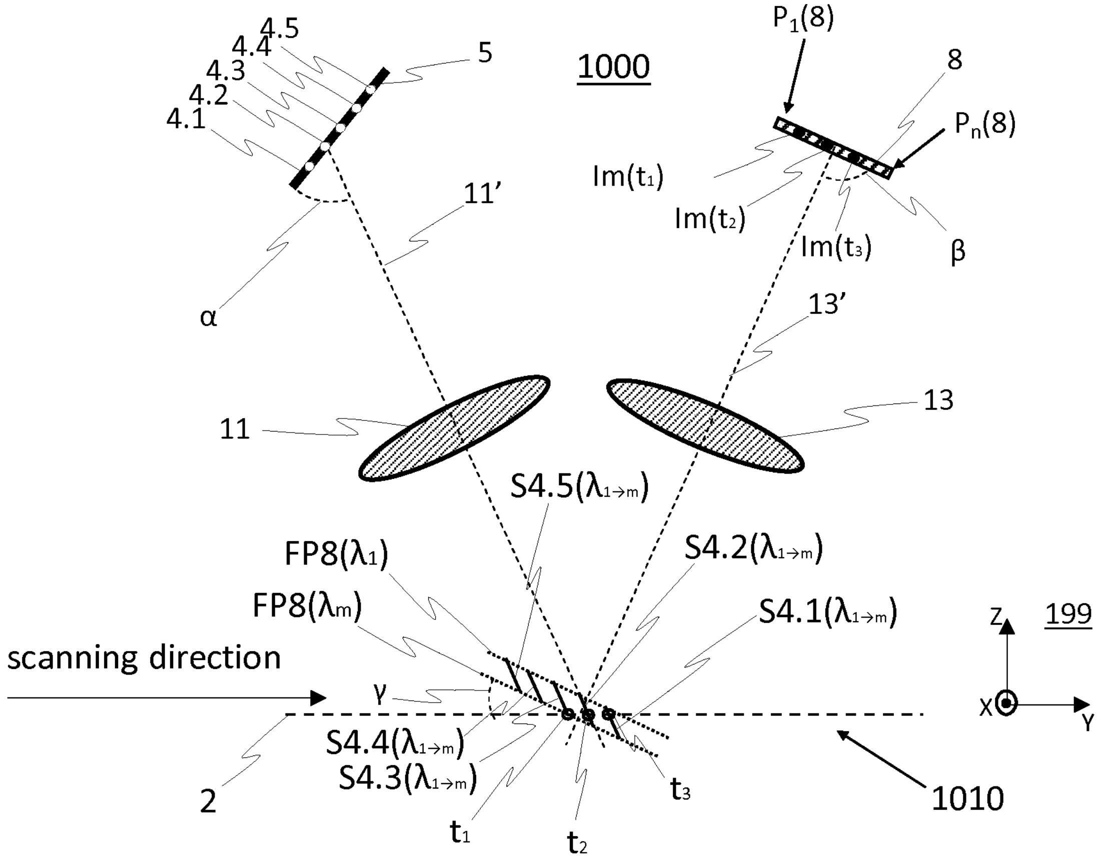
FIGS. 11-12 illustrates schematically a further variation of a device in accordance with the present invention.

In FIG. 11 is shown an example for determining intensity values for the light reflected from a certain point of the object 2 with a plurality of different wavelengths. The device 1000 of the figure corresponds to the device 900 and hence the same or corresponding parts are denoted by the same reference numerals, and duplicate textual description will be omitted as well. The determining intensity values for the light reflected from a certain point of the object 2 with a plurality of different wavelengths is not however restricted to the device 900. Actually, the same can be done with other embodiments of the disclosure, for example with the device 400 or 500.

The determining intensity values for the light reflected from a certain point of the object 2 with a plurality of different wavelengths with the device according to the invention can be done when the device comprises more than one output element and when the coincident focus points are formed by utilizing longitudinal chromatic aberration in the illuminating optics 11 and imaging optics 13. In other words, there are a plurality of coincident focus points which are formed from more than one output elements. Said coincident focus points are distributed such that there are lines of coincident focus points that are spatially separated from each other and are each associated with a certain location point of a certain output element 4.1→4.5.

Furthermore, in each line of coincident focus points the coincident focus points are arranged in increasing order of wavelength with different distances from the illuminating optics 11 and in different heights (i.e. Z-coordinate).

FIG. 11 exemplifies a scanning of the object 2 through the measuring space defined by the coincident focus points of the device 1000. In the figure, reference numerals $t_1$, $t_2$ and $t_3$ denote different time instances for the intersection of the same object point o with different coincident focus point of the measuring space. A scanning direction is denoted with long arrow from left to right above a path of the movement of the object 2. The path is illustrated as dashed line and denoted as 1010.

When determining of intensity values for the light reflected from a certain object point of the object 2 with a plurality of different wavelengths the object point is scanned through the measuring space so that it is intersected with different coincident focus points each having different dominant wavelength and is associated with a different output element as compared to the other intersected coincident focus points. In FIG. 11 the scanning is actualized so that the object point intersects at the first time instance t1 a coincident focus point of S4.3(λ1→m), at the second time instance t2 a coincident focus point of S4.2(λ1→m) and at the third time instance t3 a coincident focus point of S4.1(λ1→m). The light reflected from each of these three intersections are detected on different locations with the corresponding intensity on the light sensor 8. In the figure the locations of the detected light on the light sensor 8 are denoted as Im(t1), Im(t2) and Im(t3), respectively.

As described herein elsewhere the light reflected from the intersection of the object point with a coincident focus point produces a local maximum intensity from whose location on the light sensor 8 the position of the object point can be determined. The processor (not shown in the figures) of the device can also be configured to determine the wavelength of the light reflected from that intersection corresponding the emitted light to said coincident focus point involved with the intersection. This can be determined based on the location of the local maximum and on an information about from which output element 4.1→4.5 the light of the local maximum is provided. Therefore, the device can be configured to determine intensity value and the corresponding wavelength of the light reflected from the object point intersected a certain coincident focus point. The information from which output element 4.1→4.5 the light of the local maximum is provided can be acquired when the object 2 is moved through the measuring space in a predetermined path, whereby the coordinate of the object point in movement or scanning direction object is known in different time instances. This can be for example be encoded to the means actualizing the scanning of the object 2.

Alternatively, to know the information from which output element 4.1→4.5 the light of the local maximum is provided can be actualized such that output elements emitting the light associated with intersected coincident focus points are switched on and off in a synchronized manner with the scanning of the object.

As described hereinabove, the device utilizing longitudinal chromatic aberration in its illuminating 11 and imaging optics 13 to form coincident focus points can be calibrated such that each positions of the coincident focus points associated with different location points P1→Pn of the individual output elements 4.1→4.*n* corresponds a certain wavelength λ1→m and a certain location point on the light sensor 8. Therefore, it is possible to determine the wavelength of the local maximum based on such a calibration and on an location information of the local maximum on the light sensor 8 and an information about from which output element 4.1→4.*n* the light of the local maximum is provided.

Figure 12:
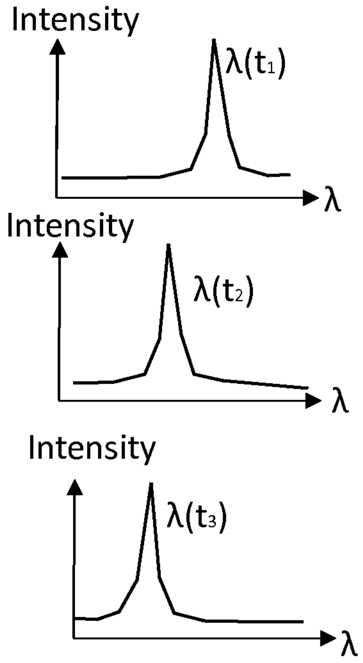

In FIG. 12 it is shown schematic drawings of the wavelength distribution of the light provided to the different intersected coincident focus at the time instances t1, t2 and t3, respectively. The maximum intensities of these distribution correspond to the dominant wavelength of the intersected coincident focus point at the time instances t1, t2 and t3. FIG. 12 therefore illustrates that the local maximum detected for the light on the locations of Im(t1), Im(t2) and Im(t3) of the light sensor 8 each have different wavelengths.

Consequently, within the same time as the surface profile of the object is acquired in the scanning measurement it is advantageously possible to determine intensity value for the light reflected from the surface points with a plurality of different wavelengths. Furthermore, it is advantageously possible to increase the number of determined intensity values with different wavelengths for the light reflected from a certain object point by increasing the number of coincident focus points to be intersected with that object point that can be done by increasing the number of output elements.

One further advantage is that when the same surface point is measured with several wavelengths this improves also the resolution of the acquired surface profile measurement due to a reduced uncertainty caused by noise compared to a measurement where each of the measured object points are intersected with only one coincident focus.

In a method according to an embodiment, the method comprises a step of determining intensity value for the light reflected from the object point 2.1 with at least two different wavelength, the step comprises the following phases:

- acquiring intensity values of the detected light on the light sensor 8 in a plurality of different time instances comprising at least first and second time instances;
- moving the object 2 with respect to the device between each two time instances in a predetermined path, whereby the object point 2.1 is intersected with at least two coincident focus points, each of the at least two coincident focus points having different dominant wavelength and is associated with a different output element 4.1→4.*n* as compared to the other at least two coincident focus points intersected with the object point 2.1;
- determining locations and respective intensity values for local maxima of the acquired intensity values of the detected light; and
- determining intensity value for the light reflected from the object point 2.1 with at least two different wavelength based on the determined locations and respective intensity values of the local maxima and on an information about from which output element 4.1→4.*n* the light of the local maximum is provided.

In FIGS. 5*a*, 5*b*1 and 5*b*2 and hereinabove it is demonstrated that when adjacent output elements 4.1→4.*n* are spaced close enough each other the local intensity maxima of detected light provided from these adjacent, different output elements 4.1→4.*n* may locate on the same position on the light sensor 8.

Figure 13:
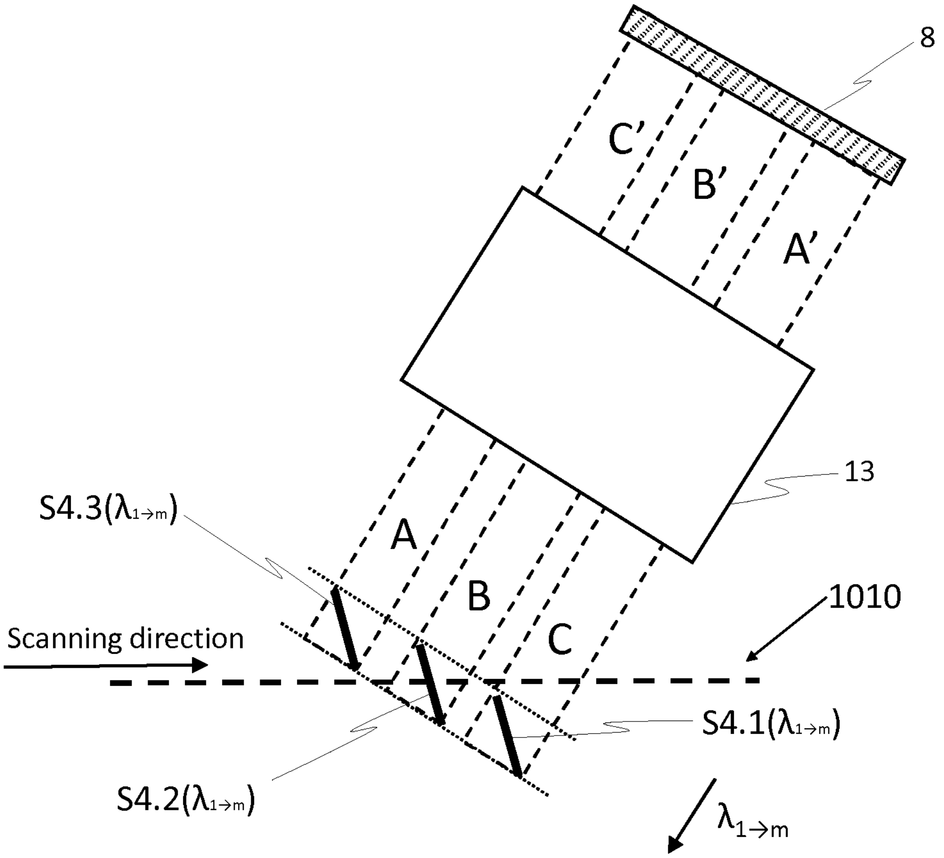
FIGS. 13-14 illustrate examples for spacing adjacent output elements.

When the adjacent output elements 4.1→4.*n* are spaced far enough from each other the local intensity maxima (i.e. peaks) of detected light provided from these adjacent, different output elements 4.1→4.*n* cannot overlap at all on the light sensor 8. In this case the calibration of the device can be realized unambiguously and for each local intensity maxima on the light sensor 8 there is just one, known output element 4.1→4.*n* from which the light of the local intensity maximum may be provided. This kind of case is illustrated in FIG. 13. In the figure there are three spatially separated lines of coincident focus points S4.1(λ1→m), S4.2(λ1→m) and S4.3(λ1→m), each consisting of coincident focus points associated with three output elements 4.1, 4.2 and 4.3 (these three output elements and illuminating optics 11 are not shown in the figure). Due to the enough spacing between 4.1, 4.2 and 4.3 the lines of coincident focus points S4.1 (λ1→m), S4.2(λ1→m) and S4.3(λ1→m) associated with these three output elements are spaced so far apart from each other on the measuring space that measurement areas of these lines, depicted A, B and C in the figure, are imaged via the imaging optics 13 on the separated, non-overlapping areas of imaging A', B' and C', respectively, on the light sensor 8. When different areas of imaging do not overlap each other, as is the case in the figure, there is just one output element 4.1→4.*n* from which the light of the local intensity maximum may be provided, as shown in the figure. It is possible to design the spacing of the adjacent output elements 4.1→4.*n* so that there are separate areas of imaging on the light sensor which each of the areas of imaging corresponds unambiguously only one output element 4.1→4.*n*.

Figure 14:
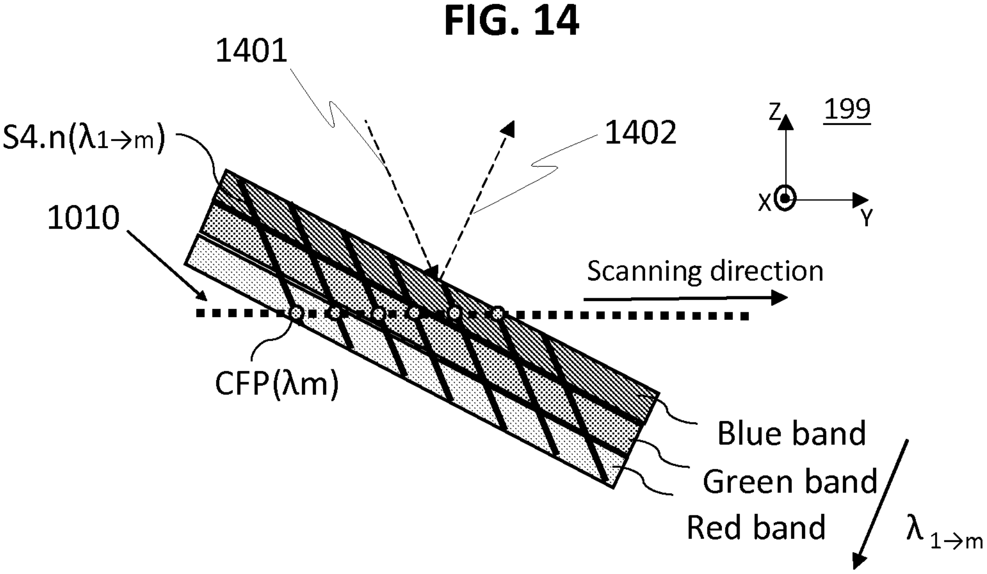

One way to space or dispose adjacent output elements 4.1→4.*n* more dense compared to the design shown in FIG. 13 is to use an RGB sensor as the light sensor 8. This is exemplified in FIG. 14 where a measuring space consisting of ten spatially separated lines of coincident focus points is illustrated. 1401 depicts a direction from which light from ten output elements 4.1→4.10 is provided into the respective line of coincident focus points. A line of coincident focus point S4.*n*(λ1→m and its one coincident focus point CFP (λm) having a wavelength of λm, are depicted in the figure. 1402 depicts a direction of the RGB sensor (output elements 4.1→4.10, illuminating optics 11 and imaging optics 13 are not shown in the figure). Blue, green and red bands depict wavelength bands of the focal planes of the RGB sensor 8. These three separate bands of focal planes of the RGB sensor 8 can be used to divide three overlapping areas of imaging into three separate areas on the sensor. In other words, three adjacent lines of coincident focus points can be spaced so dense that there is a coincident focus point from each of said three adjacent lines that have the same location on the RGB sensor 8. There can thus be one coincident focus point in each red, green and blue focal plane band that are associated with the same imaging focus point of a certain location on the light sensor 8, wherein a local intensity maximum of each of channel on said location can be identified unambiguously identify to correspond a certain output element 4.1→4.*n* due to the calibration.

Figure 15:
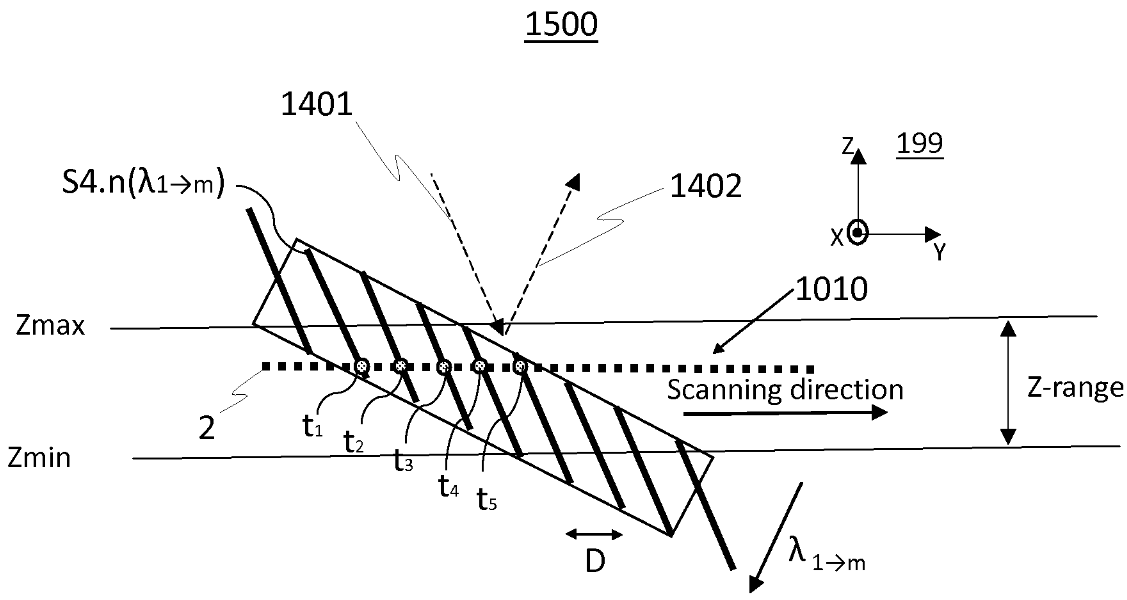
FIG. 15 illustrates an example of scanning of the object.

In FIG. 15 is shown a scanning of an object 2 through a measuring space defined by coincident focus points of nine different lines of coincident focus points (i.e. there are coincident focus points associated with nine different output elements 4.1→4.*n*) of an embodiment 1500 of the device. For the sake of convenience the output elements 4.1→4.*n*, illuminating 11 and imaging optics 13 and the light sensor 8 are not shown in the figure. What is shown in the figure is that a certain object point of the object 2 intersects with the coincident focus points in a certain order in a predetermined path 1010, shown as a dashed line intersecting five lines of coincident focus points at five different time instances t1, t2, t3, t4 and t5. It is important to note that a Z-range of the measuring space is adjusted such that each object points (surface points) of the object 2 intersect the same number of different lines of coincident focus points associated with different output elements 4.1→4.*n*. In the figure the Z-range is adjusted such the number of different lines of coincident focus points intersected with the object point is five.

In the figure by a reference sign D is depicted the distance or spacing between adjacent lines of coincident focus points that is adjusted in this example to be same between each lines of coincident focus points. This means that the output elements in this example are disposed at equal distances from each other. It has to be noted that the distances between adjacent output elements of the device do not need to be the same but can be varied depending on the application.

When it is known how much the object has to be moved in the predetermined path 1010 in the scanning direction between two successive time instances and the corresponding spacing D of the adjacent lines of coincident focus points (i.e. the distances between the output elements are known), the period of time dT between two successive time instances tn-1 and tn (i.e. dT=tn−tn-1) is also known.

At the first time instance t1 the object point of the object 2 intersects with the coincident focus point of one line of coincident focus points S4.*n*(λ1→m). This intersection causes a local intensity maximum on a certain location (e.g. a XY-location) of the light sensor 8. Because the trajectory of the object is known, due to the predetermined path 1010, the physical object point of the object causes another local intensity maximum on a new location (e.g. a new XY-location) of the light sensor at the second time instance t2=t1+dT1 which new location can be calculated from the preceding location. This procedure can be repeated at new time instances t1+dT1+dT2+dT3 . . . as many times until the same object point has moved through the whole measuring space. When the object 2 has passed the whole measuring space no more signal (i.e. intensity maximum) is detected. In this example there are five intersection of the object point with five coincident focus points of different lines of coincident focus points, and hence, five local intensity maxima is detected at five different time instances t1→t5. Each output element 4.1→4.*n* associated with these intersections can be then identified by fitting these measured intersections to a proper set of five corresponding output elements that provide the light of detected successive local intensity maximum on the light sensor 8. The surface height on the position of the object point can be determined from the calibration based on the location of the local intensity maximum on the light sensor 8 and the information from which output element the light caused said local intensity maximum is provided. The wavelength of said local maximum can be determined based on the location of said local intensity maximum on the light sensor 8 and the information from which output element the light caused said local intensity maximum is provided. The position of the object point can thus be determined, among other properties such as a wavelength and intensity of a certain local intensity maximum, as many times as the object point is intersected with the line of coincident focus points, which improves e.g. determining of the height (i.e. Z-coordinate) of the object point. In this example the height of the object point is therefore determined five times.

As mentioned hereinabove the spacing between a certain pair of output elements 4.1→4.*n* can be different than the spacing between other adjacent output elements in the device. This dissimilarity in the spacing of the adjacent output elements 4.1→4.*n* can be used in identifying which output element provided the light of a certain local maximum. For example, if there was one dissimilar spacing of the adjacent output elements in the device of example of FIG. 15, it does not matter if there is not a local intensity maximum e.g. at the first time instance t1, due to the low reflectivity of the object surface at the correspondence wavelength, for instance.

In this case four local intensity maxima are determined at time instances t4→t5 whereby the dissimilarity in the spacing of the adjacent output elements 4.1→4.*n* identifies the missing local intensity maximum to be the first or the last in the order of the detected local intensity maxima. In the case when the local intensity maximum is missing between the first and the last local intensity maximum (i.e. reflectivity of the surface of the object is low at the corresponding wavelength) the locations of the missing local intensity maximum can be determined based on the determined periods of time between successive time instances and on the total time between the first and last time instances.

In an embodiment, at least one spacing between the adjacent output elements 4.1→4.*n* is dissimilar to other spacings between the adjacent line-like output elements 4.1→4.*n*.

The invention has been explained above with reference to the above embodiments, and several advantages of the invention have been demonstrated. The disclosure is not limited to the embodiments described above, but the inventive idea can be applied in numerous ways within the scope of the claims.

The features recited in dependent claims are mutually freely combinable unless otherwise explicitly stated.

The invention claimed is:

1. A device for determining a position and/or optical properties of an object, comprising:

a point-like or line-like output element for providing light;

illuminating optics for directing light from the output element to the object;

a light sensor for detecting intensity values of light at a plurality of location points on said sensor; and, imaging optics for collecting light from the object to the light sensor, wherein:

the illuminating optics is configured to focus light from a location point of the output element on a plurality of illuminating focus points or focus areas positioned at different distances from the illuminating optics along an illuminating coordinate axis associated with a principal ray of the illuminating optics for the location point of the output element, wherein the principal ray is the mutual for the plurality of illuminating focus points or focus areas focused from the location point of the output element, and wherein each of the illuminating focus points or focus areas along the same illuminating coordinate axis differs from each other at least in a dominant wavelength of said illuminating focus points or focus areas or shape and/or is formed with a different optical aperture of the illuminating optics, the imaging optics is configured to form for each of the location points of the light sensor a plurality of imaging focus points or focus areas positioned at different distances from the imaging optics along an imaging coordinate axis associated with a corresponding principal ray of the imaging optics for the corresponding location point of the light sensor, wherein the corresponding principal ray is the mutual for the plurality of imaging focus points formed from the corresponding location point of the light sensor, and wherein each of the imaging focus points or focus areas along the same imaging coordinate axis differs from each other at least in the dominant wavelength of said imaging focus points or focus areas or shape and/or is focused with a different optical aperture of the imaging optics, the illuminating optics and the imaging optics are configured to form a plurality of coincident focus points or focus areas so that each of the various focus points or focus areas from the plurality of illuminating focus points or focus areas along the same illuminating coordinate axis coincides at a coincident focus point or focus area with an imaging focus point or focus area positioned along a different imaging coordinate axis, where the orientation of the illuminating coordinate axis is different from the orientations of the imaging coordinate axes and that each of the coincident focus points or focus areas consists of an illuminating and imaging focus point or focus area associated with a common dominant wavelength or shape and/or is formed with the correlated optical apertures of the illuminating optics and the imaging optics, and in that the device is configured to determine the position and/or optical properties of an object point of the object from the local maximum of the intensity values of the light detected by the light sensor so that:

the position of the object point is determined from the location of said local maximum; and/or the optical properties of the object point are determined from the intensity or the wavelength of said local maximum, where said local maximum is a result of the light collected from the intersection of the object point and one of the coincident focus points or focus areas.

2. The device according to claim 1, characterized in that the device comprises a plurality of line-like or point-like output elements or combinations thereof.

3. The device according to claim 1, characterized in that:

longitudinal chromatic aberration is provided in the illuminating optics to focus light from each of the location points for each of the output elements on a plurality of illuminating focus points positioned at different distances from the illuminating optics along the corresponding illuminating coordinate axis associated with the corresponding principal ray of the illuminating optics for the corresponding location point of the corresponding output element so that each of the illuminating focus points along the same illuminating coordinate axis differs in the dominant wavelength; and, longitudinal chromatic aberration is provided in the imaging optics to form from each of the location points of the light sensor a plurality of imaging focus points positioned at different distances from the imaging optics along the corresponding imaging coordinate axis associated with the corresponding principal ray of the imaging optics for the corresponding location point of the light sensor so that each of the focus points along the same imaging coordinate axis differs in the dominant wavelength.

4. The device according to claim 1, characterized in that spherical aberration is provided in the illuminating optics to focus light from each of the location points for each of the output elements on a plurality of imaging focus points positioned at different distances from the illuminating optics along the corresponding illuminating coordinate axis associated with the corresponding principal ray of the illuminating optics for the corresponding location point of the corresponding output element so that each of the illuminating focus points along the same illuminating coordinate axis is formed with a different optical aperture of the illuminating optics, and in that spherical aberration is provided in the imaging optics to form from each of the location points of the light sensor a plurality of imaging focus points positioned at different distances from the imaging optics along the corresponding imaging coordinate axis associated with the corresponding principal ray of the imaging optics for the corresponding location point of the light sensor so that each of the focus points along the same imaging coordinate axis is formed with a different optical aperture of the imaging optics.

5. The device according claim 1, characterized in that:

astigmatism is provided in the illuminating optics to focus light from each of the location points for each of the output elements on a plurality of illuminating focus areas with different shapes positioned at different distances from the illuminating optics along the corresponding illuminating coordinate axis associated with the corresponding principal ray of the illuminating optics for the corresponding location point of the corresponding output element so that each of the illuminating focus areas along the same illuminating coordinate axis is formed with the different optical apertures of the illuminating optics; and, astigmatism is provided in the imaging optics to form from each of the location points of the light sensor a plurality of imaging focus areas with different shapes positioned at different distances from the imaging optics along the corresponding imaging coordinate axis associated with the corresponding principal ray of the imaging optics for the corresponding location point of the light sensor so that each of the focus areas along the same imaging coordinate axis is formed with the different optical apertures of the imaging optics.

6. The device according to claim 3, characterized in that when astigmatism is provided in the illuminating optics and the imaging optics, each of the coincident focus area consists of an illuminating and imaging focus areas associated with the common shape and is formed with the correlated optical apertures of the illuminating optics and the imaging optics.

7. The device according to claim 3, characterized in that when the device comprises more than one output elements, the device is configured to determine the wavelength of the local maximum of the intensity values of the light detected by the light sensor to distinguish from which output element the light of the local maximum is provided to determine the position of the intersected object point.

8. The device according to claim 1, characterized in that when measuring an object) that is at least partially transparent or translucent for the light being directed to the object, the device is configured to determine a thickness between a first surface and a second surface of the object that is at least partially transparent or translucent for the light being directed to the object from the position difference between the local maximum of the intensity values of the detected light on the light sensor 8 that is a result from the first surface and the local maximum of the intensity values of the detected light on the light sensor that is a result from the second surface.

9. The device according to claim 1, characterized in that the light sensor is a line scan camera or a matrix camera being disposed substantially perpendicular to an optical axis of the imaging optics and the plurality of output elements being disposed on a plane surface, wherein the plane surface forms an oblique angle to an optical axis of the illuminating optics.

10. The device according to claim 1 characterized in that at least one spacing between the adjacent output elements is dissimilar to other spacings between the adjacent output elements.

11. A method for determining a position and/or optical properties of an object, characterized in that the method comprises:

providing an optical illuminating and optical detecting of the object from different directions so that:

light is focused from a location point of an output element on a plurality of illuminating focus points or focus areas positioned at different distances from illuminating optics along an illuminating coordinate axis associated with a principal ray of the illuminating optics for said location point of said light output element, wherein the principal ray is the mutual for the plurality of illuminating focus points or focus areas focused from said location point, and wherein each of the illuminating focus points or focus areas along the same illuminating coordinate axis differs from each other at least in a dominant wavelength or shape of said illuminating focus points or focus areas and/or is formed with a different optical aperture of said illuminating optics, and a plurality of imaging focus points or focus areas positioned at different distances from imaging optics along an imaging coordinate axis associated with a corresponding principal ray of the imaging optics for a corresponding location point of the light sensor are formed from each of a plurality of location points of the light sensor, wherein the corresponding principal ray is the mutual for the plurality of imaging focus points or focus areas formed from the corresponding location point of the light sensor, and wherein each of the imaging focus points or focus areas along a same imaging coordinate axis differs from each other at least in the dominant wavelength or shape of said imaging focus points or focus areas and/or is focused with a different optical aperture of the imaging optics;

forming a plurality of coincident focus points so that each of the various focus points from the plurality of illuminating focus points or focus areas along the illuminating coordinate axis coincides at a coincident focus point or focus area with a imaging focus point or focus area positioned along a different imaging coordinate axis, where the orientation of the illuminating coordinate axis is different from the orientations of the imaging coordinate axes and that each of the coincident focus points or focus areas consists of an illuminating and imaging focus point or focus area associated with a common dominant wavelength or shape and/or is formed with the correlated optical apertures of the illuminating optics and the imaging optics;

detecting by the light sensor the intensity values of the light collected from the object by the imaging optics; and determining the position and/or optical properties of an object point of the object so that the position of the object point is determined from the location, and/or the optical properties object point are determined from the intensity or the wavelength of the local maximum of the intensity values of the detected light, where said local maximum is a result of the light collected from the intersection of the object point and one of the coincident focus points or focus areas.

12. The method according to claim 11, characterized in that the illuminating optics focuses each of the illuminating focus points along the same corresponding illuminating coordinate axis for the corresponding location point of the corresponding output element with different optical apertures of the illuminating optics by using spherical aberration; and, the imaging optics focuses each of the imaging focus points along the same imaging coordinate axis with different optical apertures of the imaging optics by using spherical aberration.

13. The method according to claim 11, characterized in that:

the illuminating optics focuses each of the illuminating focus areas along the same corresponding illuminating coordinate axis for the corresponding location point of the corresponding output element differing from each other in shape by using astigmatism; and, the imaging optics focuses each of the imaging focus areas along the same imaging coordinate axis differing from each other in shape by using astigmatism.

14. The method according to claim 11, characterized in that the method comprises:

arranging the light sensor substantially perpendicular to an optical axis of the imaging optics; and disposing a plurality of output elements on a plane surface, wherein the plane surface forms an oblique angle to an optical axis of the illuminating optics, preferably wherein the plurality of output elements consists of a plurality of line-like output elements.

15. The method according to claim 11, characterized in that the method comprises at least one of the following steps:

moving the object with respect to the device so that the object point is intersected with at least one coincident focus point, wherein each of the at least one coincident focus point has the same common dominant wavelength;

moving the object with respect to the device so that the object point intersected with at least one coincident focus point, wherein each of the at least one coincident focus point is formed with the correlated optical apertures of the illuminating optics and the imaging optics;

moving the object with respect to the device so that the object point intersected with at least one coincident focus area, wherein each of the at least one coincident focus area consists of illuminating and imaging focus areas associated with the common shape and is formed with the correlated optical apertures of the illuminating optics and the imaging optics.

16. The method according to claim 14, characterized in that the method comprises at least one of the following steps:

moving the object with respect to the device so that the object point is intersected with a number of coincident focus points, wherein each of the number of coincident focus points has a different dominant wavelength when the number of the intersected coincident focus points is more than one;

moving the object with respect to the device so that the object point is intersected with a number of coincident focus points, wherein each of the number of coincident focus points is formed with differently correlated optical apertures of the illuminating optics and the imaging optics when the number of the intersected coincident focus points is more than one;

moving the object with respect to the device so that the object point is intersected with a number of coincident focus areas, wherein each of the number of coincident focus area consists of illuminating and imaging focus areas associated with the common shape and is formed with the correlated optical apertures of the illuminating optics and the imaging optics, wherein each coincident focus areas differs in shape and is formed with differently correlated optical apertures of the illuminating optics and the imaging optics when the number of the coincident focus areas intersected with the object point is more than one.

17. The method according to claim 11, characterized in that the method comprises:

acquiring intensity values of the detected light on the light sensor in a plurality of different time instances comprising at least first and second time instances;

moving the object with respect to the device between each two time instances in a predetermined path, whereby the object point is intersected with at least two coincident focus points, each of the at least two coincident focus points having different dominant wavelength and is associated with a different output element as compared to the other at least two coincident focus points intersected with the object point;

determining locations and respective intensity values for local maxima of the acquired intensity values of the detected light; and determining intensity value for the light reflected from the object point with at least two different wavelength based on the determined locations and respective intensity values of the local maxima and on an information about from which output element the light of the local maximum is provided.

18. A device for determining a position and/or an optical property of an object, comprising:

a plurality of point-like and/or line-like output elements for providing illumination light emanating from a plurality of location points;

illuminating optics for directing the light from the plurality of output elements to the object;

a sensor for detecting light intensity at a plurality of locations on said sensor; and imaging optics for imaging light reflected from the object onto the sensor, wherein the illuminating optics are configured such that said illumination light emanates from said illumination optics along respective separate principal illumination axes, and such that said illumination light emanating from each of said location points is focused to a plurality of illumination foci or focal regions located at different distances from the illuminating optics along respective ones of said separate principal illumination axes, wherein each of the illumination foci or focal regions along the same illumination axis differs at least in dominant wavelength or shape and/or is formed through different optical apertures of the illuminating optics, wherein the imaging optics are configured to form a plurality of different imaging axes and to form imaging foci or focal regions located at different distances from the imaging optics along respective imaging axes corresponding to respective imaging points of the sensor, wherein each of the imaging foci or focal regions along the same imaging axis differs at least in dominant wavelength or shape and/or is focused through different optical apertures of the imaging optics, wherein the illuminating optics and the imaging optics are configured to form a plurality of matching foci or focal regions such that each of the plurality of illumination foci or focal regions along the same illumination axis corresponds to an imaging focus or focal region arranged along a different imaging axis at a matching focal point or region, and wherein the orientations of the illumination axes differ from the orientations of the imaging axes, and each of the matching foci or focal regions comprises an illumination and imaging focus or focal region associated with a common dominant wavelength or shape and/or formed through correlated optical apertures of the illuminating optics and the imaging optics, and wherein a plurality of said illumination foci or focal regions are imaged simultaneously on said sensor;

wherein the device is configured to determine the position and/or the optical property of one or more object points of the object) from one or more local maxima of the light intensity values detected by the light sensor, such that:

one or more positions of the object points are determined from the location or locations of the one or more local maxima; and/or the optical properties of the object points are determined from the intensity or the wavelength of the one or more local maxima, wherein the one or more local maxima result from light collected at intersections of the object points and respective ones of the matching foci or focal regions.

19. The device according to claim 18 wherein the illumination foci or focal regions along a first illumination axis from a first output location point are located at different depths in the virtual measurement space than the illumination foci or focal regions along a second illumination axis from a second output location point.

20. The device of claim 19 wherein said plurality of output elements comprises at least two line-like geometric shapes.

21. The device of claim 18 wherein each of the illumination foci or focal regions along the same illumination axis differs at least in shape and/or is formed through different optical apertures of the illuminating optics.

22. The device according to claim 18, wherein a distribution of the matching foci defines an at least two-dimensional measurement space for determining the location of the object point of the object being measured.

23. The device according to claim 1, wherein the sensor is a matrix camera disposed substantially perpendicular to the optical axis of the imaging optics and the plurality of output elements are arranged on a plane, and the plane forms an angle with respect to the optical axis of the illuminating optics.

24. The device according to claim 19, wherein at least one spacing between adjacent output elements is dissimilar to another spacing between other adjacent output elements.

* * * * *